US010503121B2

(12) United States Patent
Matsunaga et al.

(10) Patent No.: US 10,503,121 B2
(45) Date of Patent: Dec. 10, 2019

(54) WRISTWATCH WITH FLEXIBLE CIRCUIT BOARD INSTALLED THROUGH BAND PORTION

(71) Applicant: SONY MOBILE COMMUNICATIONS INC., Tokyo (JP)

(72) Inventors: Kentaro Matsunaga, Tokyo (JP); Tatsuhito Aono, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/268,907

(22) Filed: Sep. 19, 2016

(65) Prior Publication Data

US 2017/0097610 A1    Apr. 6, 2017

(30) Foreign Application Priority Data

Oct. 5, 2015    (JP) .................. 2015-198075

(51) Int. Cl.
| | |
|---|---|
| *G04B 47/00* | (2006.01) |
| *G04B 37/14* | (2006.01) |
| *G04G 17/06* | (2006.01) |
| *G06F 1/16* | (2006.01) |

(52) U.S. Cl.
CPC ......... *G04B 47/00* (2013.01); *G04B 37/1486* (2013.01); *G04G 17/06* (2013.01); *G06F 1/163* (2013.01); *G06F 1/1681* (2013.01); *G06F 1/1683* (2013.01)

(58) Field of Classification Search
CPC .... G04B 47/00; G04B 37/1486; G04G 17/06; G06F 1/163; G06F 1/1681; G06F 1/1683
USPC ........................................................ 361/749
See application file for complete search history.

(56) References Cited

U.S. PATENT DOCUMENTS

| | | | |
|---|---|---|---|
| 9,798,356 B2* | 10/2017 | Nakayama | G06F 1/163 |
| 2015/0116917 A1* | 4/2015 | Aono | G06F 1/1681 361/679.04 |
| 2016/0139564 A1* | 5/2016 | Tsushima | G04R 60/04 368/282 |
| 2017/0000222 A1* | 1/2017 | Lee | A44C 5/147 |

FOREIGN PATENT DOCUMENTS

JP    2014-172476    9/2014

\* cited by examiner

*Primary Examiner* — Tremesha S Willis
(74) *Attorney, Agent, or Firm* — Xsensus LLP

(57) ABSTRACT

There is provided an electronic device including: a first segment and a second segment linked to each other in a rotationally movable manner; a flexible circuit board installed throughout the first segment and the second segment in interiors of the first segment and the second segment; a loosening portion formed by the flexible circuit board being pushed out while being bent in the second segment; and a support unit configured to maintain a direction of pushing-out of the loosening portion to a fixed direction.

20 Claims, 20 Drawing Sheets

AT TIME OF STRETCHING

REPEATED BENDING AND STRETCHING

AT TIME OF BENDING

WRISTWATCH WITH FLEXIBLE CIRCUIT BOARD INSTALLED THROUGH BAND PORTION

CROSS REFERENCE TO RELATED APPLICATIONS

This application claims the benefit of Japanese Priority Patent Application JP 2015-198075 filed Oct. 5, 2015, the entire contents of which are incorporated herein by reference.

BACKGROUND

The present disclosure relates to an electronic device.

Thus far, wearable electronic devices designed to be attached to a user (hereinafter, occasionally referred to as "wearable devices") have been known. As a method for, during the formation of a wearable device, electrically connecting electronic components such as a battery, a microcomputer, a memory, and a communication device to each other, there is a method of using a flexible circuit board. The flexible circuit board is formed by, for example, an electrically conductive interconnection pattern being formed on a board having flexibility, and portions of the interconnection pattern other than terminal portions that electrically connect electronic components being coated with an insulating layer. Such a flexible circuit board is used also in portable small-sized electronic devices, and is useful to reduce the size and thickness of the electronic device (e.g. see JP 2004-172476A).

SUMMARY

As an embodiment of the wearable device, there is a wristwatch-type electronic device. If the band portion of a wristwatch is configured as a wearable device or as a part of a wearable device, it is expected that the band portion can be used as a wearable device excellent in portability, wearability, or designability. Here, there are wristwatch bands formed by a plurality of links (segments) being linked, for example.

However, to obtain a band-type wearable device formed by linking a plurality of links, for example, it is necessary to, while installing electronic components individually in different links, install a flexible circuit board throughout a plurality of links and electrically connect these electronic components. At this time, since the band formed by linking a plurality of links is bent and stretched, it is necessary to cause the flexible circuit board to follow the movement of bending and stretching without damaging it.

Thus, in an embodiment of the present disclosure, a novel and improved electronic device that is formed by linking a plurality of segments and in which a flexible circuit board is installed throughout a plurality of segments is provided.

According to an embodiment of the present disclosure, there is provided an electronic device including: a first segment and a second segment linked to each other in a rotationally movable manner; a flexible circuit board installed throughout the first segment and the second segment in interiors of the first segment and the second segment; a loosening portion formed by the flexible circuit board being pushed out while being bent in the second segment; and a support unit configured to maintain a direction of pushing-out of the loosening portion to a fixed direction.

As described above, according to an embodiment of the present disclosure, an electronic device that is formed by linking a plurality of segments and in which a flexible circuit board is installed throughout a plurality of segments is obtained. By the electronic device, the flexible board can be caused to follow the movement of bending and stretching of the electronic device without being damaged.

Note that the effects described above are not necessarily limitative. With or in the place of the above effects, there may be achieved any one of the effects described in this specification or other effects that may be grasped from this specification.

DETAILED DESCRIPTION OF THE EMBODIMENT(S)

Figure 1:
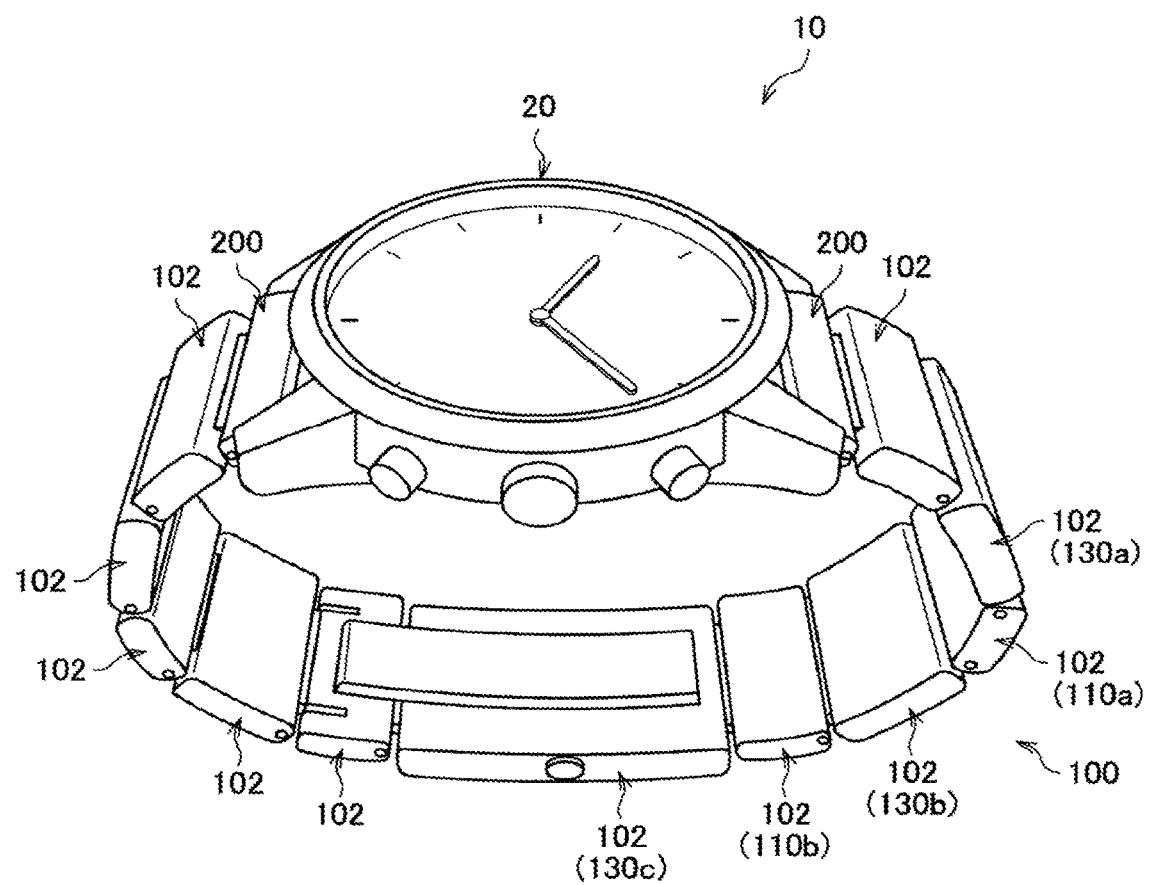
FIG. 1 is a perspective view showing an example in which an electronic device according to an embodiment of the present disclosure is connected as the band portion of a wristwatch.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description is given in the following order.
1. Basic configuration of the electronic device
2. Configuration of the segments
2-1. Overall configuration of the first segment and the second segment
2-2. First segment
2-3. Second segment
2-4. Loosening portion of the FPC
2-5. Modification examples of the support unit
2-6. Water resistance function
3. Connection structure of the electronic device

1. Overall Configuration of the Electronic Device

First, the overall configuration of an electronic device according to an embodiment of the present disclosure is described. FIG. 1 shows a perspective view of a wristwatch 10 in which an electronic device 100 according to the embodiment is connected.

The electronic device 100 according to the embodiment is a device that can be used as a part or the whole of the band portion of a wristwatch. In the following, an example in which the electronic device 100 according to the embodiment is used as the band portion of a wristwatch is described; but the electronic device 100 may not only be used for wristwatches, but also be used to be connected to other articles such as accessories. The electronic device 100 includes a plurality of links (segments) 102 that are linked to be arranged in a prescribed direction, connecting links 200, and a fastener 106. The electronic device 100 is connected to a watch main body 20 by the connecting links 200.

The plurality of links 102 include first segments 130 (130a, 130b, and 130c) in which an electronic component can be housed and second segments 110 (110a and 110b) linked to first segments 130. In the electronic device 100 shown in FIG. 1, three first segments 130a, 130b, and 130c and two second segments 110a and 110b that are linked individually between first segments 130 are provided. The first segment 130 and the second segment 110 are linked in a rotationally movable manner. The electronic device 100 includes a not-shown flexible circuit board (hereinafter, occasionally referred to as an "FPC") installed throughout the first segments 130 and the second segments 110. The first segment 130 functions as a housing link that houses an electronic component, and the second segment 110 functions as an adjusting link that adjusts the extra length of the FPC associated with the bending and stretching movement of the first segment 130 and the second segment 110.

The electronic device 100 includes, for example, at least one electronic component of an electricity storage device, an arithmetic unit, a memory device, and a communication device. These electronic components are housed in the first segment 130. The electricity storage device may be, for example, any of a capacitor, a secondary battery, and an electricity storage device formed of a combination of these. However, an electricity storage device other than the examples mentioned above may be used. The electricity storage device may be designed to be charged by an external charging device. In the embodiment, an example in which a secondary battery is provided as the electricity storage device is described.

The arithmetic unit may be, for example, a comparator, a microcomputer, or the like with a simple configuration. The memory device may be, for example, a memory element capable of temporarily storing information, such as a random access memory (RAM). In the case where the arithmetic unit is a microcomputer, the memory device may include a memory element that stores a program to be executed by the microcomputer, such as a read-only memory (ROM).

The communication device may be, for example, a device of a wireless system utilizing infrared light, an electromagnetic wave, or an electric field. Alternatively, the communication device may be a device capable of making proximity communication typified by near field communication (NFC). In the case where the electronic device 100 is connected to another device installed in the surroundings, the communication device may be a device of a wired system. The electronic device 100 may include, other than the above, various electronic components as necessary. For example, the electronic device 100 may include a lighting device such as an LED, a sound generating device, etc.

The electronic device 100 has, for example, an electronic money function, a function of notifying the arrival of an e-mail at a smartphone or the like, the updating of a social networking service (SNS), etc., or a function of taking a log of the number of steps, consumed calories, etc. However, the functions mentioned above that the electronic device 100 has are only examples, and the electronic device 100 may have other functions.

2. Configuration of the Segments

Figure 2:
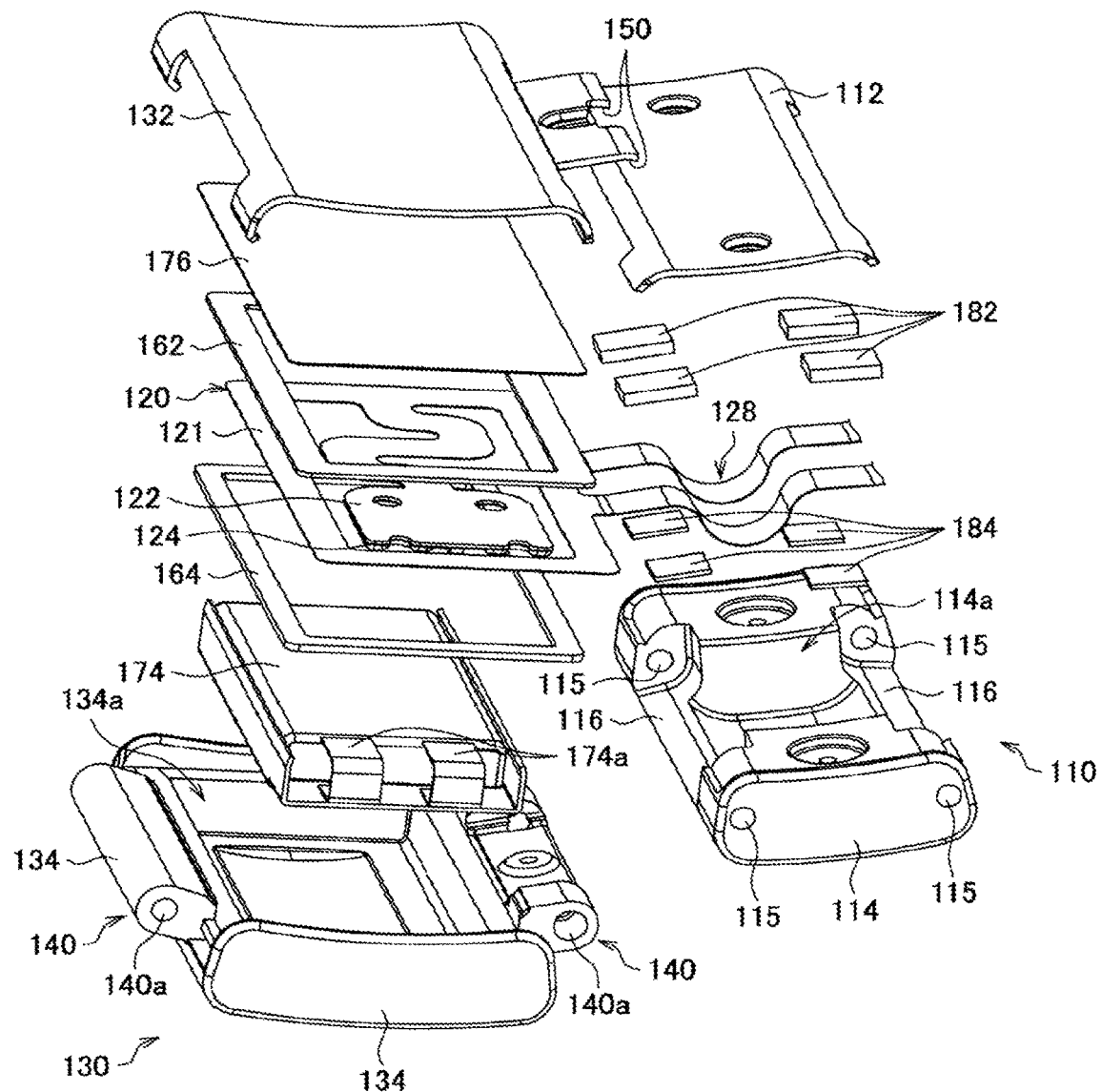
FIG. 2 is a disassembled perspective view showing the configuration of the electronic device according to the embodiment.
Figure 3:
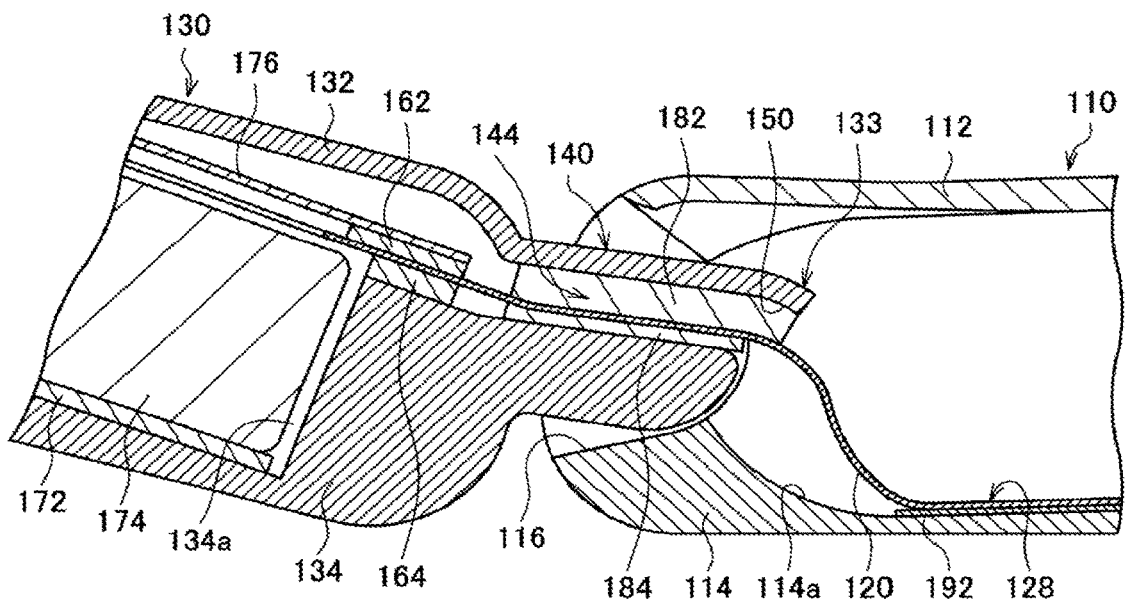
FIG. 3 is a partial cross-sectional view showing the configuration of the electronic device according to the embodiment.

Next, the first segment 130 and the second segment 110 out of the plurality of links (segments) 102 included in the electronic device 100 are described in detail. FIG. 2 and FIG. 3 show a disassembled perspective view and a partial cross-sectional view, respectively, of the first segment 130 and the second segment 110 included in the electronic device 100. FIG. 2 and FIG. 3 show one first segment 130 and one second segment 110 linked to each other out of the links 102 included in the electronic device 100, and show the first segment 130a and the second segment 110a shown in FIG. 1.

In FIG. 2 and FIG. 3, the lower side in the drawing (the side where casings 114 and 134 are located) is located on the front side (the outside) at the time of wearing the electronic device 100. Similarly, in FIG. 4, FIG. 6, FIG. 7, FIG. 8, FIG. 9, FIG. 10, and FIG. 11, the lower side in the drawing corresponds to the front side of the electronic device 100. Hereinafter, "the front side" or "the back side" refers to the front side (the outside) or the back side (the inside), respectively, at the time of wearing the electronic device 100. Further, the "the width direction" refers to a direction crossing the direction of arrangement of the plurality of links 102, and the "width" refers to the length in the width direction.

2-1. Overall Configuration of the First Segment and the Second Segment

The first segment 130 includes an arm unit 140 in an end portion on the second segment 110 side. The arm unit 140 is inserted in an insertion opening 116 provided in the second segment 110. In this state, a not-shown fixing pin is inserted in a pin insertion hole 140a provided in the arm unit 140 and a pin insertion hole 115 provided in the second segment 110 so as to penetrate through them, and thus the first segment 130 and the second segment 110 are linked together in a rotationally movable manner. The first segment 130 and the second segment 110 can rotationally move on the fixing pin as the rotation axis. When the first segment 130 is rotationally moved relative to the second segment 110, the arm unit 140 of the first segment 130 comes into contact with a cover 112 or a casing 114 of the second segment 110, and thereby the range of rotational movement of the first segment 130 is regulated.

A not-shown interconnection pattern is formed on an FPC 120 installed through the first segment 130 and the second segment 110. Portions of the interconnection pattern other than terminal portions to which connector portions 124 are electrically connected are coated with an insulating layer. As the material of the matrix of the FPC 120, for example, an insulating resin such as a polycarbonate, an acrylic, polystyrene, polypropylene, or polyethylene terephthalate may be used. As the material of the interconnection pattern, an electrically conductive material such as indium tin oxide, gold, or silver may be used. As the material of the insulating layer, an insulating resin such as a polycarbonate, an acrylic, polystyrene, polypropylene, or polyethylene terephthalate may be used.

In the electronic device 100 according to the embodiment, an ultrathin FPC 120 is used so that the reaction force at the time of bending and stretching the first segment 130 and the second segment 110 does not become large.

In the first segment 130, a secondary battery 174 as an example of the electronic component is housed. As described later, in the interior of the first segment 130, at least the secondary battery 174 and the electrical connection portion between the secondary battery 174 and the FPC 120 are placed in a water resistant space.

On the other hand, in the second segment 110, an electronic component is not housed, and the FPC 120 is pushed out while being bent to form a loosening portion 128. In the second segment 110, since an electronic component is not housed, electrically conductive portions such as the interconnection pattern of the FPC 120 are not exposed, and there is no fear of short-circuiting, electric leakage, or corrosion. Therefore, a water resistant space is not present in the second segment 110.

Figure 4:
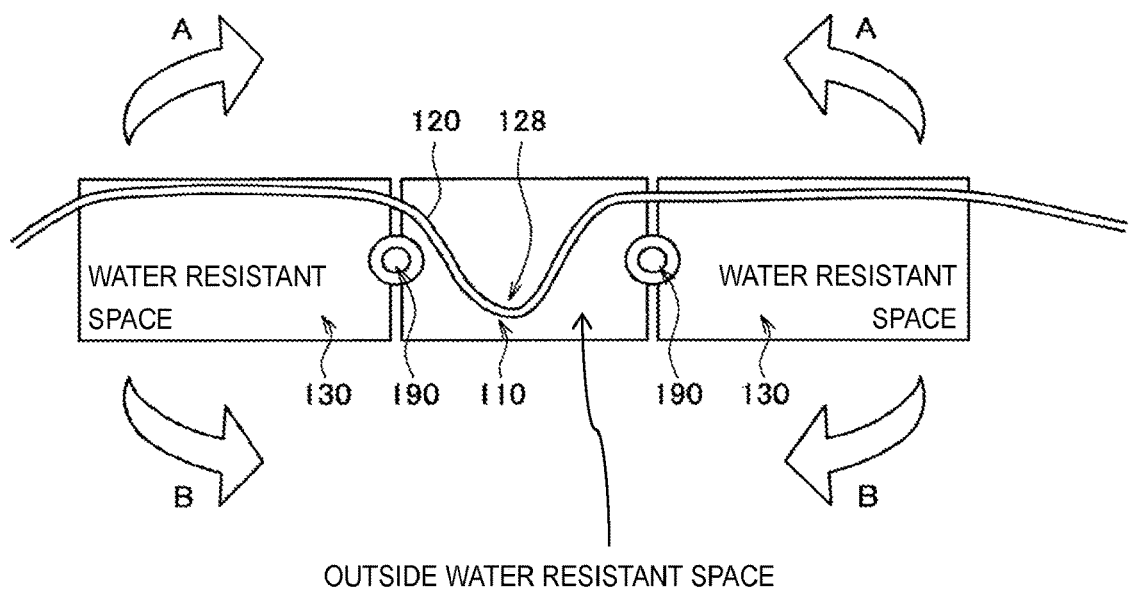
FIG. 4 is an illustration diagram showing a state where a second segment is linked between two first segments.

FIG. 4 is a schematic diagram showing a state where a second segment 110 is linked between two first segments 130. As described above, a water resistant space is provided in the first segment 130, whereas the second segment 110 is set outside the water resistant space. Each of the first segment 130 and the second segment 110 linked to each other can rotationally move on a rotation axis 190 of the link portion as the center. At this time, when the FPC 120 is installed a little on the back side (the upper side in the drawing), the length of installation of the FPC 120 changes with the bending and stretching movement of the first segment 130 and the second segment 110.

That is, when a state where the first segment 130 and the second segment 110 are stretched as shown in FIG. 4 is taken as a reference, by bending the first segment 130 and the second segment 110 in the direction of arrow A so that the front side of the electronic device 100 protrudes, the length of installation of the FPC 120 becomes shorter. On the other hand, by bending the first segment 130 and the second segment 110 in the direction of arrow B so that the back side of the electronic device 100 protrudes, the length of installation of the FPC 120 becomes longer. Although in FIG. 4 the first segment 130 and the second segment 110 are shown in a rectangular shape and the range of rotational movement appears to be limited, the first segment 130 and the second segment 110 shown in FIG. 2 and FIG. 3 can rotationally move in an appropriate range.

At this time, since an electronic component is housed in the first segment 130 and is electrically connected to the FPC 120, it is not desirable for the position of the FPC 120 to shift in the first segment 130. Hence, in the electronic device 100 according to the embodiment, the loosening portion 128 is provided in the FPC 120 installed in the second segment 110, and the loosening portion 128 is deformed by loosening; thereby, the change in the length of installation of the FPC 120 can be followed.

Figure 5:
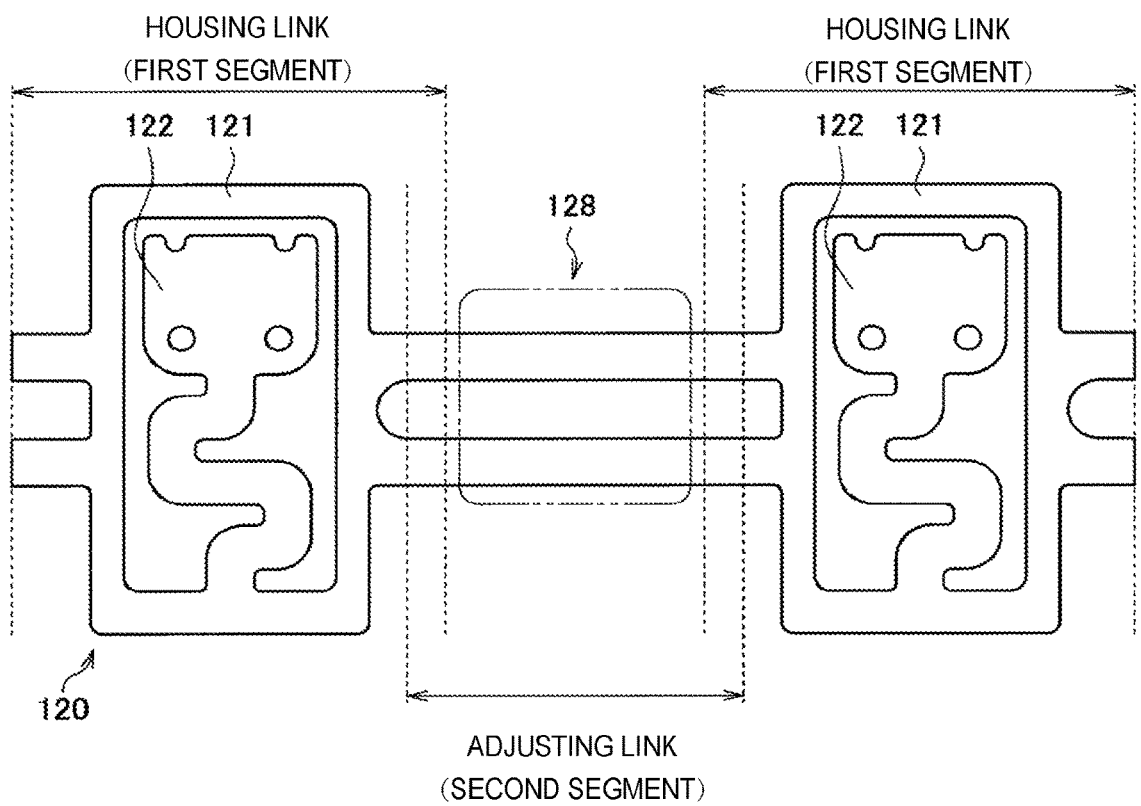
FIG. 5 is a plan view showing a flexible circuit board.

FIG. 5 is a plan view showing an example of the planar configuration of the FPC 120 used for the electronic device 100 according to the embodiment. The FPC 120 is processed in a desired planar configuration by forming an interconnection pattern on the matrix, further forming an insulating layer, and then performing, for example, punching processing or the like. In the portion installed in the first segment 130 of the FPC 120, a frame portion 121 and an electrical connection portion 122 are provided.

The portion installed in the second segment 110 of the FPC 120 is divided into two sections, and each of them has a width smaller than the width of the frame portion 121. The portion installed in the second segment 110 of the FPC 120 is pushed out while being bent, and thereby the loosening portion 128 is formed. The not-shown interconnection pattern is formed so as to connect the terminal portions of the electrical connection portions 122 installed in two first segments 130, for example.

2-2. First Segment

Returning to the description of FIG. 2 and FIG. 3, the first segment 130 includes a casing 134 and a cover 132. As the material that forms the casing 134 and the cover 132, for example, stainless steel, titanium, or a resin material may be used. The casing 134 has a housing portion 134a, and the secondary battery 174 is housed in the housing portion 134a. On the casing 134 in which the secondary battery 174 is housed, a first bonding member 164, the FPC 120, a second bonding member 162, and a water resistant cover 176 are stacked in this order. In this state, the cover 132 is put over from the back side, both ends of the cover 132 are locked to the casing 134, and the cover 132 is thus fixed to the casing 134.

The FPC 120 has connector portions 124 electrically connected to terminals 174a of the secondary battery 174. The connector portion 124 is electrically connected to a terminal portion formed in the FPC 120, and the secondary battery 174 is electrically connected to the interconnection pattern of the FPC 120. The FPC 120 is fixed to an edge portion of the housing portion 134a of the casing 134 by the first bonding member 164. The FPC 120 installed in the first segment 130 has the frame portion 121 fixed to the casing 134 and the electrical connection portion 122 provided continuously from part of the frame portion 121 toward the inside of the frame portion 121. The frame portion 121 of the FPC 120 is fixed to the casing 134 by the first bonding member 164 in a frame-like shape that has a shape corresponding to the frame portion 121.

The second bonding member 162 is stuck to the back surface side of the frame portion 121 of the FPC 120, and the water resistant cover 176 is fixed via the second bonding member 162. As the first bonding member 164 and the second bonding member 162 that fix the FPC 120 to the casing 134 or the water resistant cover 176, for example, a water resistant adhesive paper sheet having an adhesive layer on both surfaces may be used. However, the first bonding member 164 and the second bonding member 162 are not particularly limited to the extent that they are a water resistant bonding sheet. As the water resistant cover 176, for example, a sheet made of a resin such as polyethylene terephthalate may be used.

The first bonding member 164 and the second bonding member 162 are formed in a frame-like shape without a break; and their one surface is stuck to the frame portion 121 of the FPC 120, and their other surface is stuck to the water resistant cover 176 or the casing 134. The housing portion 134a of the casing 134 is formed by molding or the like, and does not have a gap or the like communicating with the outside except for the opening through which the secondary battery 174 is installed. Therefore, the space enclosed by the water resistant cover 176, the second bonding member 162, the frame portion 121 of the FPC 120, the first bonding member 164, and the housing portion 134a forms a water resistant space.

In a position on the outside of the position of placement of the first bonding member 164 and the second bonding member 162, the FPC 120 extending to the second segment 110 side is led out to the outside of the first segment 130 via the arm unit 140. In the arm unit 140, the casing 134 and the cover 132 form a board installation opening 144 (see FIG. 3). The FPC 120 passes through the board installation opening 144 and is led out to the second segment 110 side.

The FPC 120 installed in the board installation opening 144 is fixed to the casing 134 by a bonding sheet 184. That is, the FPC 120 is fixed to the casing 134 of the first segment 130 not only by the first bonding member 164 but also by the bonding sheet 184. Therefore, the behavior or stress of the FPC 120 in the second segment 110 is absorbed by the bonding sheet 184 in association with the bending and stretching movement of the first segment 130 and the second segment 110. Consequently, the stress transmitted to the first bonding member 164 and the second bonding member 162 that ensure the water resistance function can be reduced.

The bonding sheet 184 has also a function as a buffer member that separates the FPC 120 from the edge of the casing 134 located at the exit of the board installation opening 144. For example, the bonding sheet 184 is placed to extend up to an area facing the edge of the casing 134, and the FPC 120 is prevented from coming into direct contact with the edge of the casing 134 even when a bending deformation of the FPC 120 has occurred. Therefore, the FPC 120 can be prevented from receiving a flaw or a dent due to contact with the edge of the casing 134. As the bonding sheet 184, for example, a water resistant adhesive paper sheet having an adhesive layer on both surfaces may be used.

A buffer member 182 is stuck to the surface on the cover 132 side of the FPC 120 installed in the board installation opening 144. The buffer member 182 has the function of separating the FPC 120 from the edge of the cover 132 located at the exit of the board installation opening 144. For example, the buffer member 182 is installed up to an area facing the edge of the cover 132, and the FPC 120 is prevented from coming into direct contact with the edge of the cover 132 even when a bending deformation of the FPC 120 has occurred. Therefore, the FPC 120 can be prevented from receiving a flaw or a dent due to contact with the edge of the cover 132. As the buffer member 182, for example, a water resistant adhesive paper sheet having an adhesive layer on the surface on the FPC 120 side may be used.

As the buffer member 182 to be stuck to the surface on the cover 132 side of the FPC 120, also a bonding sheet having an adhesive layer on both surfaces may be used; thus, the FPC 120 may be fixed to the inner surface of the cover 132. Further, in the arm unit 140, a plurality of bonding sheets or buffer members may be placed to be stacked on at least one surface of the FPC 120.

In the inner surface of the cover 132 serving to form the board installation opening 144, a support unit 150 that guides the led-out FPC 120 to the front side (the lower side in the drawing) is formed. The support unit 150 has the function of maintaining the direction of pushing-out of the loosening portion 128 of the FPC 120 formed in the second segment 110 to a fixed direction. In the example of the electronic device 100 according to the embodiment, the support unit 150 maintains the direction of pushing-out of the loosening portion 128 of the FPC 120 to the front side even when the first segment 130 and the second segment 110 are rotationally moved.

The support unit 150 shown in FIG. 2 and FIG. 3 is formed by inclining an end portion of the cover 132 of the first segment 130 toward the direction of pushing-out of the loosening portion 128 of the FPC 120. Specifically, the support unit 150 is formed by warping an end portion of the cover 132 toward the FPC 120 side along the direction of installation of the FPC 120. Therefore, the FPC 120 is led out from the board installation opening 144 along the warped surface of the support unit 150, and extends toward the inner surface of a housing portion 114a of the casing 114 of the second segment 110.

The inner surface of the cover 132 in which the support unit 150 is formed has a projecting portion 133 that projects further to the outside than the edge of, out of the inner surface of the board installation opening 144, the inner surface of the casing 134, which is located in the direction of pushing-out of the loosening portion 128, that is, on the front side. The support unit 150 is provided in the projecting portion 133, and the support unit 150 makes it easy for the FPC 120 to be guided to the front side.

2-3. Second Segment

The second segment 110 includes the casing 114 and the cover 112. The casing 114 has the housing portion 114a leading to the insertion opening 116, and the FPC 120 is installed in the housing portion 114a. The FPC 120 is not fixed to the second segment 110, and is freely deformed by loosening. In a state where the FPC 120 is installed in the housing portion 114a of the casing 114, the cover 112 is put over from the back side, and the cover 112 is fixed to the casing 114 by not-shown screws. Water can enter the interior of the second segment 110 via the insertion opening 116; but since neither electronic components nor electrically conductive portions are exposed in the second segment 110, there is no fear of short-circuiting, electric leakage, corrosion, etc.

A low friction layer 192 is provided on a position that is in the inner surface of the housing portion 114a of the casing 114 and that the FPC 120 can be in contact with. The low friction layer 192 is provided by, for example, sticking a sheet having a coefficient of friction smaller than the coefficient of friction of the surface of the casing 114 to the inner surface of the housing portion 114a. The low friction layer 192 can be formed by, for example, sticking a sheet containing a fluorine resin or forming a coating of a resin material containing a fluorine resin. In an embodiment of the present technology, the low friction layer 192 may be omitted.

2-4. Loosening Portion of the FPC

The loosening portion 128 of the FPC 120 formed in the second segment 110 will now be described in detail. In the electronic device 100 according to the embodiment, the loosening portion 128 formed to be pushed out while being bent is formed in the FPC 120 placed in the second segment 110. The shape of the loosening portion 128 changes with the bending and stretching movement of the first segment 130 and the second segment 110. The loosening portion 128 is maintained in a state of being loosened in the entire region of the range of rotational movement of the first segment 130 and the second segment 110. However, the degree of loosening of the loosening portion 128 changes with the bending and stretching of the first segment 130 and the second segment 110.

Figure 6:
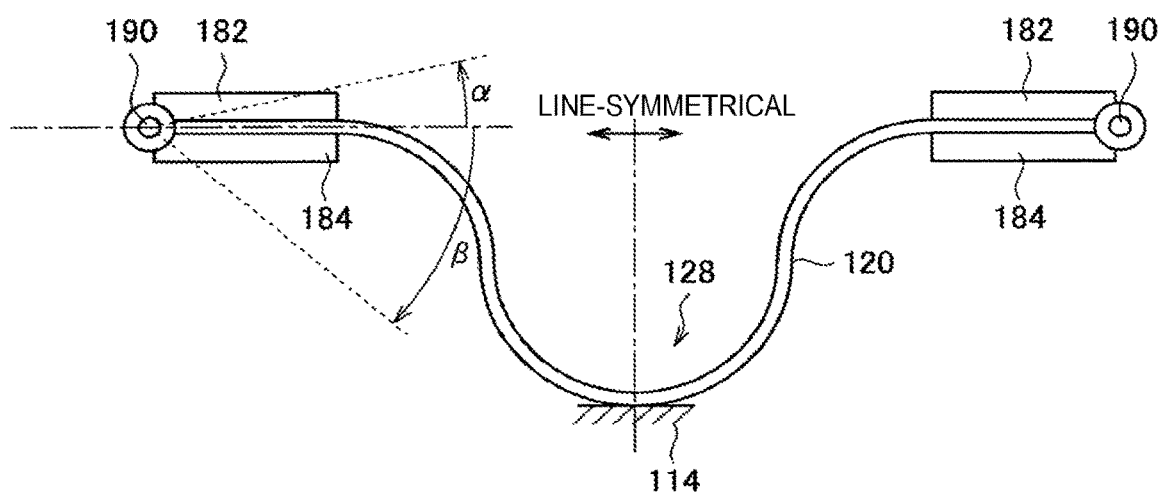
FIG. 6 is an illustration diagram showing the range of rotational movement of the first segment relative to the second segment.
Figure 7:
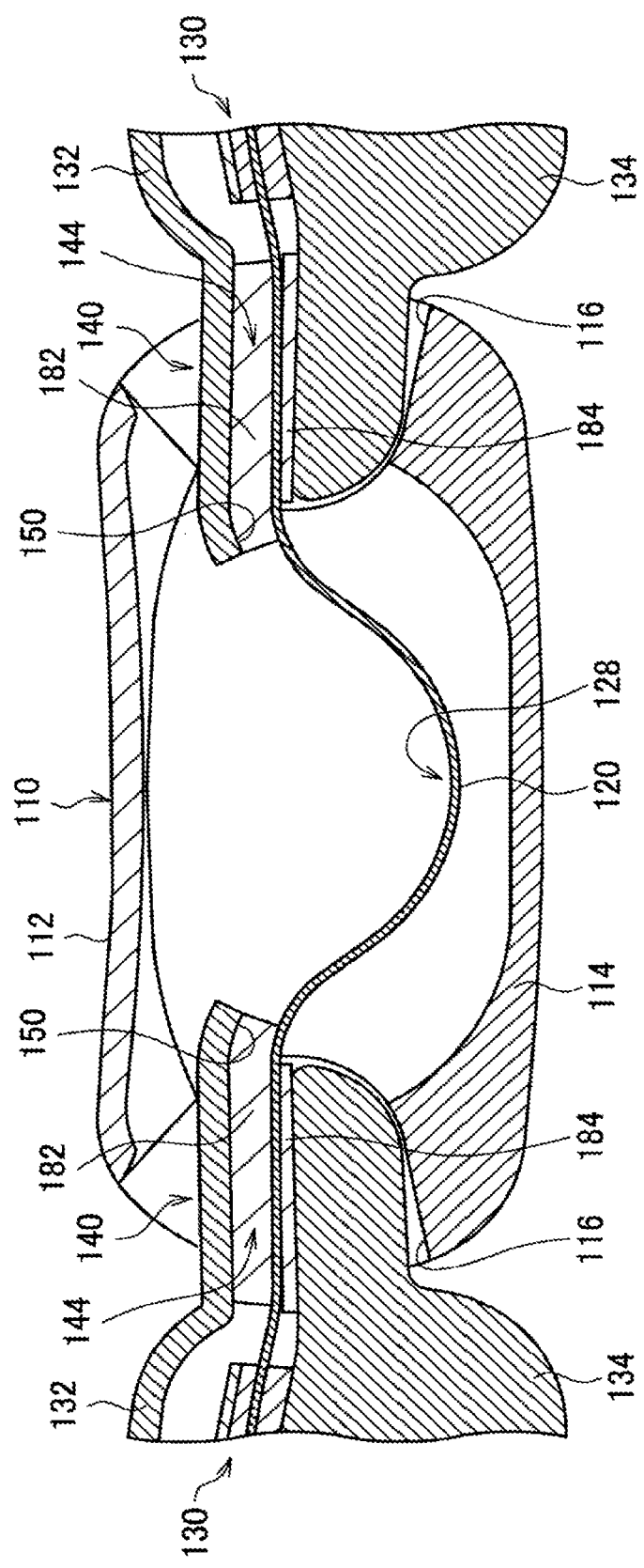
FIG. 7 is a cross-sectional view showing a state where the first segment and the second segment are stretched.
Figure 8:
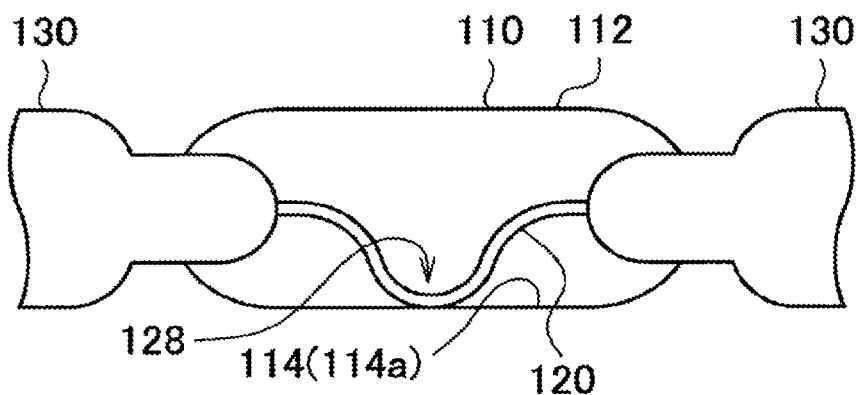
FIG. 8 is an illustration diagram showing a manner in which the first segment and the second segment are being bent and stretched.
Figure 8:
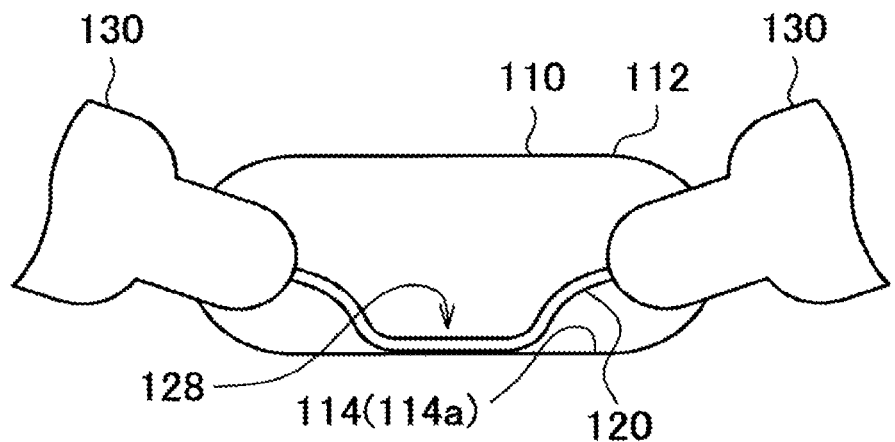

FIG. 6 to FIG. 8 are diagrams for describing the direction of pushing-out of the loosening portion 128 of the FPC 120 associated with the bending and stretching movement of the first segment 130 and the second segment 110. FIG. 6 is a schematic diagram showing the range of rotational movement of the first segment 130 relative to the second segment 110, and FIG. 7 is a cross-sectional view showing a state where the first segment 130 and the second segment 110 are stretched. FIG. 8 is a schematic diagram showing a manner in which the first segment 130 and the second segment 110 are being bent and stretched. In FIG. 6 to FIG. 8, an example in which a second segment 110 is linked between two first segments 130 is shown.

In the electronic device 100 according to the embodiment, as shown in FIG. 7, the support unit 150 that guides the FPC 120 led out from the first segment 130 to the casing 114 side is provided in the board installation opening 144 of the first segment 130. Therefore, in a state where the first segment 130 and the second segment 110 are stretched, the direction of pushing-out of the loosening portion 128 of the FPC 120 formed in the second segment 110 is maintained to the front side.

Further, in the electronic device 100 according to the embodiment, as shown in FIG. 6, the first segment 130 and the second segment 110 are bendable and stretchable so as to protrude to both the front side and the back side of the electronic device 100. The electronic device 100 according to the embodiment is used as the band of a wristwatch; when a state where the first segment 130 and the second segment 110 are stretched is taken as a reference, the range of rotational movement at the time when the first segment 130 is rotationally moved so that the front side of the electronic device 100 protrudes (angle β) is larger than the range of rotational movement at the time when the first segment 130 is rotationally moved so that the back side of the electronic device 100 protrudes (angle α). In the state where the first segment 130 and the second segment 110 are stretched, the loosening portion 128 of the FPC 120 is line-symmetrical.

Since the first segment 130 rotationally moves on the rotation axis 190 as the center relative to the second segment 110 in association with the bending and stretching movement of the first segment 130 and the second segment 110, the position where the FPC 120 is led out from the first segment 130 changes. Specifically, the distance between the position where the FPC 120 is led out from the first segment 130 and the inner surface of the casing 114 of the second segment 110 changes with the bending and stretching movement of the first segment 130 and the second segment 110. Thus, when the first segment 130 and the second segment 110 are bent, the loosening portion 128 is pressed against the inner surface of the casing 114 of the second segment 110, and the loosening shape of the loosening portion 128 is changed. In particular, in the electronic device 100 according to the embodiment, since an ultrathin FPC 120 is used, the FPC 120 flexibly follows the bending and stretching movement of the first segment 130 and the second segment 110.

Figure 9:
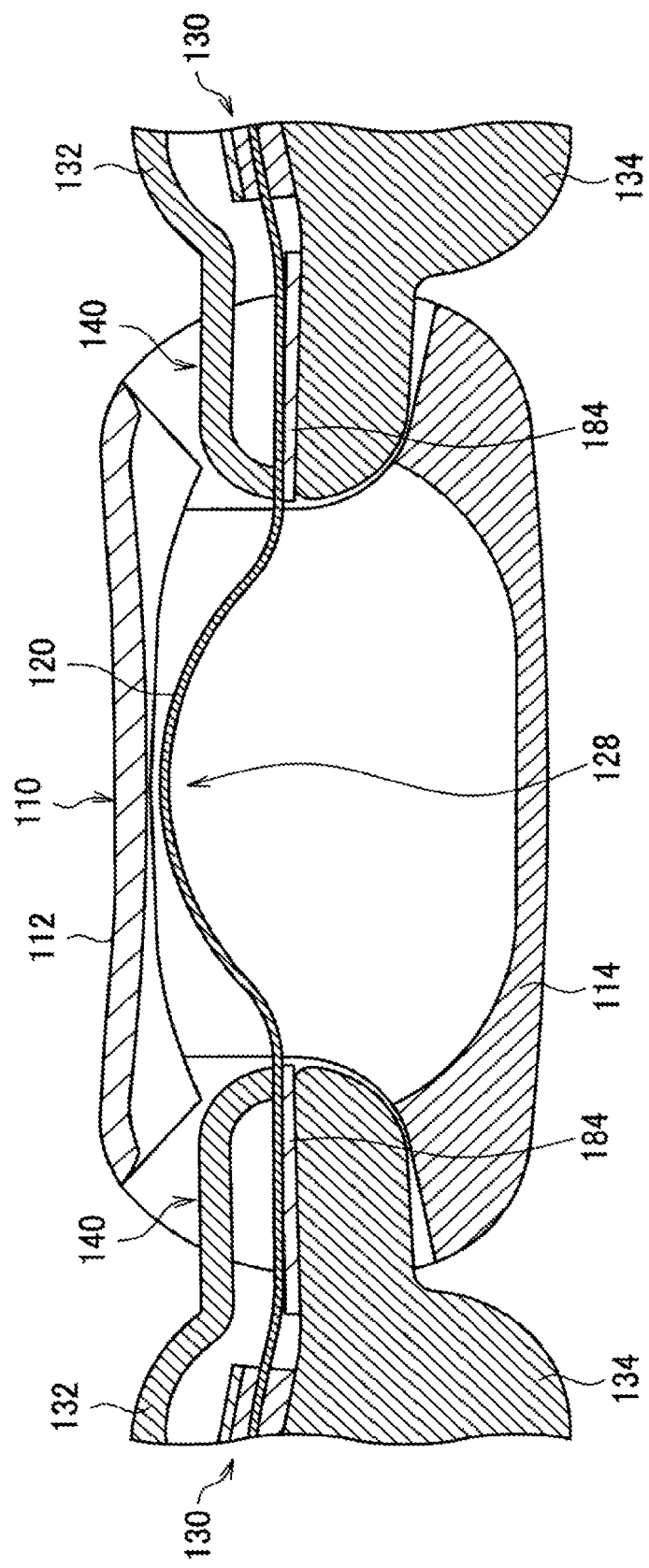
FIG. 9 is a cross-sectional view showing a loosening portion inverted.

At this time, if a support unit for maintaining the direction of pushing-out of the loosening portion 128 of the FPC 120 to a fixed direction is not provided, as shown in FIG. 9, the direction of pushing-out of the loosening portion 128 may be inverted when the first segment 130 and the second segment 110 are stretched. In particular, in the case where an ultrathin FPC 120 is used, since the rigidity is low, the direction of pushing-out of the loosening portion 128 is more likely to be inverted.

In contrast, when the support unit 150 is provided in the cover 132 of the first segment 130, in the second segment 110, the direction of pushing-out of the loosening portion 128 of the FPC 120 is maintained to the front side regardless of the bending and stretching movement of the first segment 130 and the second segment 110. Therefore, the direction of pushing-out of the loosening portion 128 of the FPC 120 is prevented from being inverted by the bending and stretching movement of the first segment 130 and the second segment 110. Thereby, a strange sound due to the bending and stretching movement of the first segment 130 and the second segment 110 and the damage to the FPC 120 caused by bending and stretching the FPC 120 repeatedly can be prevented.

At this time, as shown in FIG. 8, it is possible for the loosening portion 128 of the FPC 120 to be pressed against the inner surface of the casing 114 in the state where the first segment 130 and the second segment 110 are stretched. That is, it is possible for the degree of loosening of the loosening portion 128 to be ensured sufficiently even in the state where the first segment 130 and the second segment 110 are stretched. Thereby, the damage to the FPC 120 due to the rubbing together of the apex of the loosening portion 128 and the inner surface of the casing 114 of the second segment 110 can be suppressed.

Specifically, the position of the apex of the loosening portion 128 can change with the bending and stretching movement of the first segment 130 and the second segment 110. Hence, in the case where the loosening portion 128 of the FPC 120 comes into contact with the inner surface of the casing 114 in the course of bending and stretching movement, the FPC 120 may be rubbed at the contact between the loosening portion 128 and the casing 114, and the FPC 120 may be damaged. However, in the case where the loosening portion 128 is pressed against the inner surface of the casing 114 already from the state where the first segment 130 and the second segment 110 are stretched, when the first segment 130 and the second segment 110 are bent so that the front side of the electronic device 100 protrudes, the loosening portion 128 of the FPC 120 is further pressed against the inner surface of the casing 114.

Therefore, the loosening portion 128 can be caused to lie along the shape of the inner surface of the housing portion 114a of the casing 114; thus, what is produced in association with the bending and stretching movement of the first segment 130 and the second segment 110 is not a change in the position of the apex of the loosening portion 128, but an increase or a decrease in the contact area between the loosening portion 128 and the inner surface of the casing 114. Therefore, the damage to the FPC 120 due to the rubbing together of the apex of the loosening portion 128 and the inner surface of the casing 114 of the second segment 110 can be suppressed.

Furthermore, in the electronic device 100 according to the embodiment, the low friction layer 192 is provided on a position that is in the inner surface of the casing 114 of the second segment 110 and can be in contact with the FPC 120. Therefore, even when a positional shift has occurred in a state where the loosening portion 128 and the inner surface of the casing 114 are in contact, the FPC 120 can be prevented from receiving scratches.

Furthermore, in the electronic device 100 according to the embodiment, the FPC 120 is separated from the edge of the exit of the board installation opening 144 by the buffer member 182 and the bonding sheet placed in the board installation opening 144 through which the FPC 120 is led out from the first segment 130. Therefore, even when the loosening shape of the loosening portion 128 of the FPC 120 has changed with the bending and stretching movement of the first segment 130 and the second segment 110, damage due to the contact of the first segment 130 and the FPC 120 can be prevented.

2-5. Modification Examples of the Support Unit

In the electronic device 100 according to the embodiment, the support unit 150 for maintaining the direction of pushing-out of the loosening portion 128 of the FPC 120 to a fixed direction may be variously modified. Two modification examples of the support unit will now be described. The support unit may have a configuration other than the modification examples illustrated below.

2-5-1. First Modification Example

Figure 10:
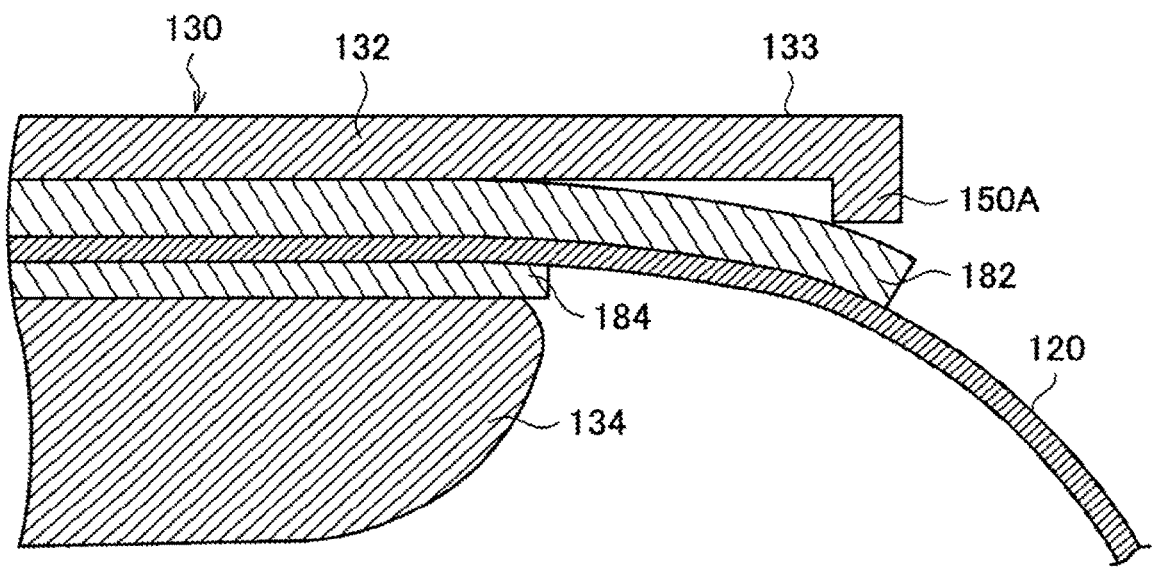
FIG. 10 is an illustration diagram showing a first modification example of a support unit.

FIG. 10 shows a support unit 150A according to a first modification example. In the first modification example, the support unit 150A is formed by, not warping the projecting portion 133 of the cover 132 toward the FPC 120 side, standing an end portion of the projecting portion 133 toward the FPC 120 side. Also by the support unit 150A, the FPC 120 led out from the first segment 130 can be guided in a prescribed direction. In the case where the support unit 150A according to the first modification example is used, for example, the thickness of the buffer member 182 may be increased. Thereby, at the contact position between the FPC 120 and the support unit 150A, the possibility of the occurrence of a flaw or a dent can be reduced.

The position of formation of the support unit 150A formed to be stood from the cover 132 toward the FPC 120 side is not limited to an end portion of the cover 132. The support unit 150A may be stood from a position recessed from the end portion of the cover 132 toward the interior of the first segment 130. The support unit 150A formed to be stood toward the FPC 120 side may not be part of the cover 132, and may be formed to be inclined toward the FPC 120 side by, for example, increasing the thickness of the buffer member 182 or the bonding sheet, or stacking a plurality of buffer members 182 or bonding sheets partly.

2-5-2. Second Modification Example

Figure 11:
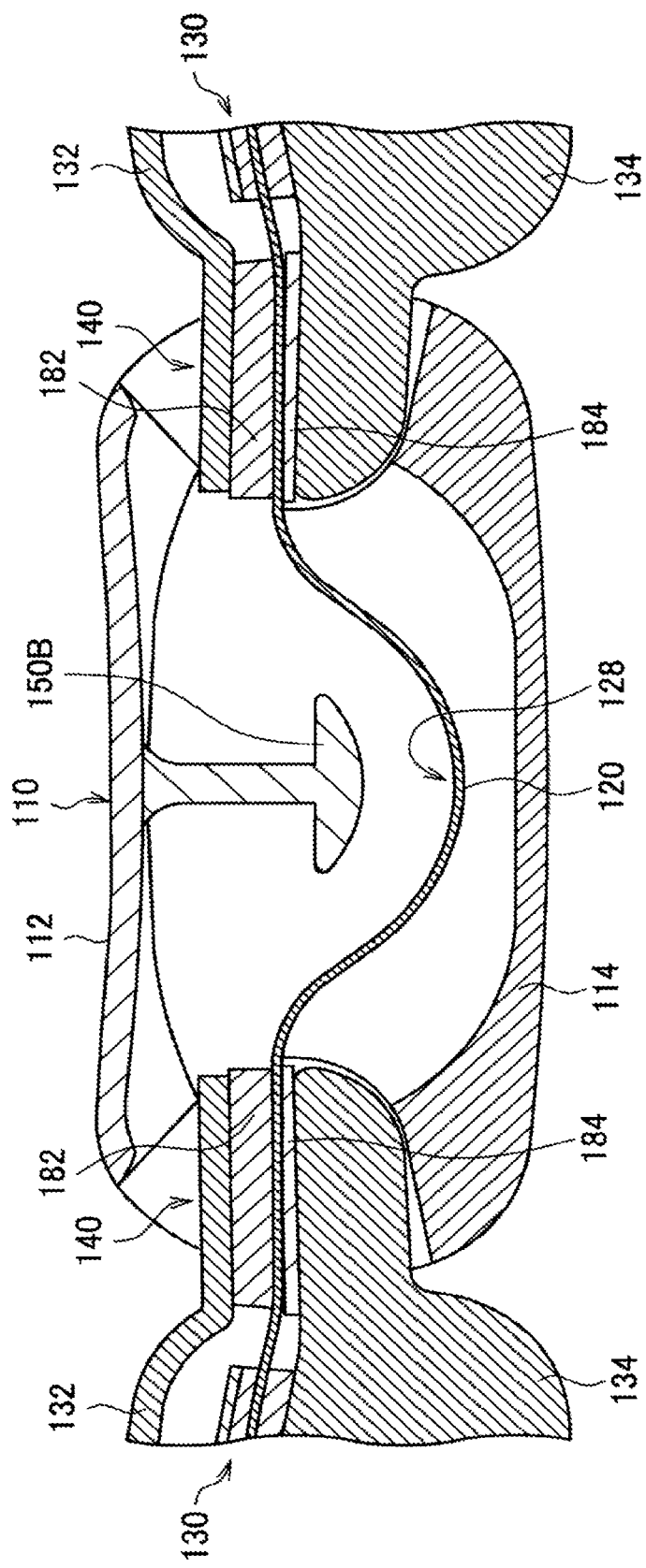
FIG. 11 is an illustration diagram showing a second modification example of the support unit.

FIG. 11 shows a support unit 150B according to a second modification example. In the second modification example, the support unit 150B is provided on the cover 112 of the second segment 110. In the electronic device 100 according to the embodiment, the cover 112 of the second segment 110 is attached from the back side, and the support unit 150B provided on the inner surface of the cover 112 is placed on the back surface side of the FPC 120. The support unit 150B is stood on the FPC 120 side from the cover 112, and the tip (the lower end in the drawing) of the support unit 150B is located inside the bending of the loosening portion 128 of the FPC 120. In a state where the first segment 130 and the second segment 110 are stretched, the tip of the support unit 150B is located on the front side (the lower side in the drawing) with respect to the position of the FPC 120 led out from the first segment 130. Therefore, the direction of pushing-out of the loosening portion 128 of the FPC 120 can be prevented from being inverted in association with the bending and stretching movement of the first segment 130 and the second segment 110.

In the case where the support unit 150B is provided on the cover 112 of the second segment 110, it is not necessary to provide a projecting portion in an end portion of the cover 132 of the first segment 130. However, in order to prevent the FPC 120 from coming into contact with the edge of the cover 132 or the casing 134 of the first segment 130 in association with the deformation of the FPC 120 and receiving a flaw or a dent, the buffer member 182 or the bonding sheet 184 may be extended up to the edge of the cover 132 or the casing 134. Further, in order to prevent the loosening portion 128 of the FPC 120 from receiving a flaw or a dent due to contact with the support unit 150B, the tip surface of the support unit 150B may be made a warped surface corresponding to the loosening shape, or a buffer member may be stuck to the tip surface of the support unit 150B.

2-6. Water Resistance Function

Figure 12:
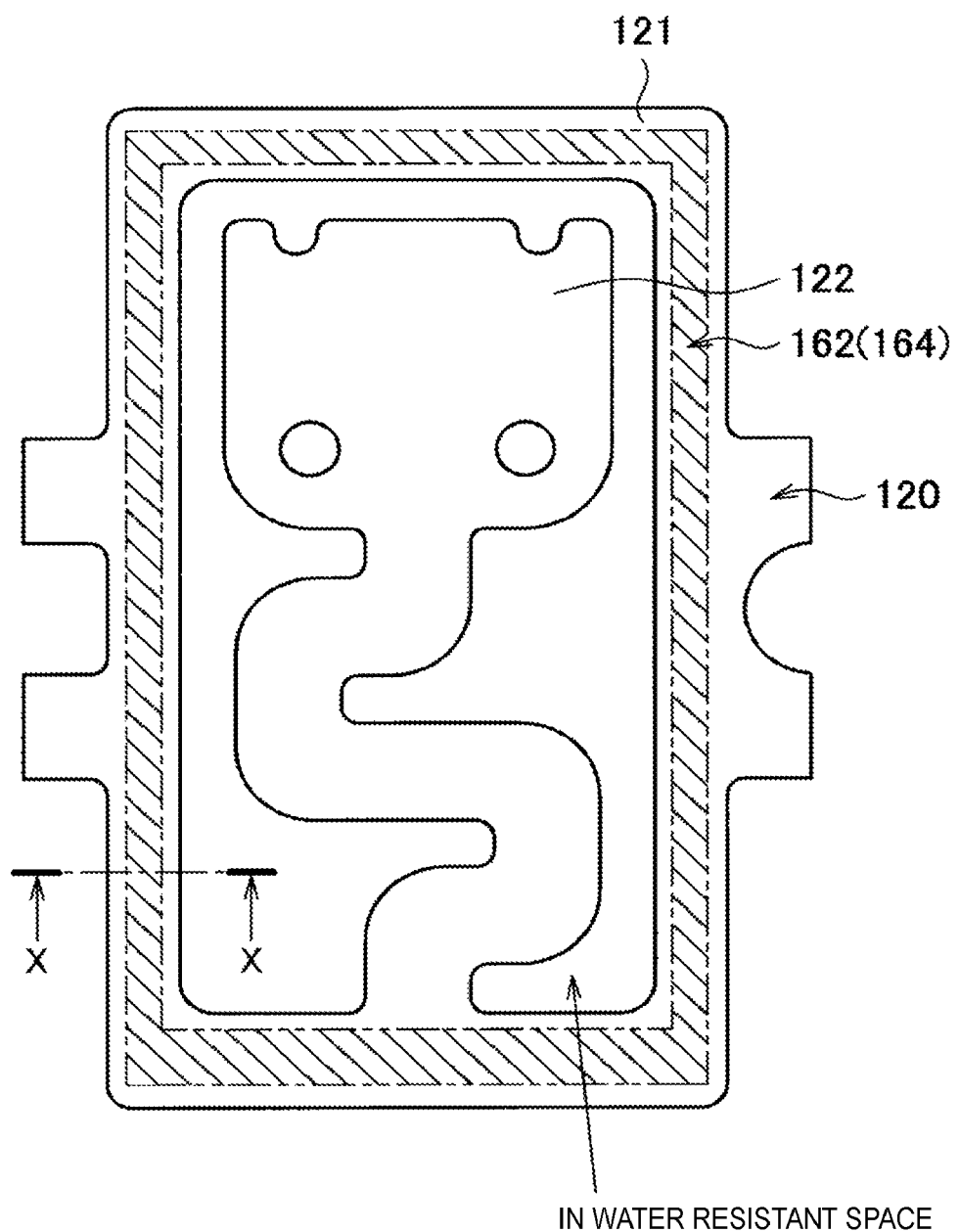
FIG. 12 is an illustration diagram showing the position of placement of a bonding member.
Figure 13:
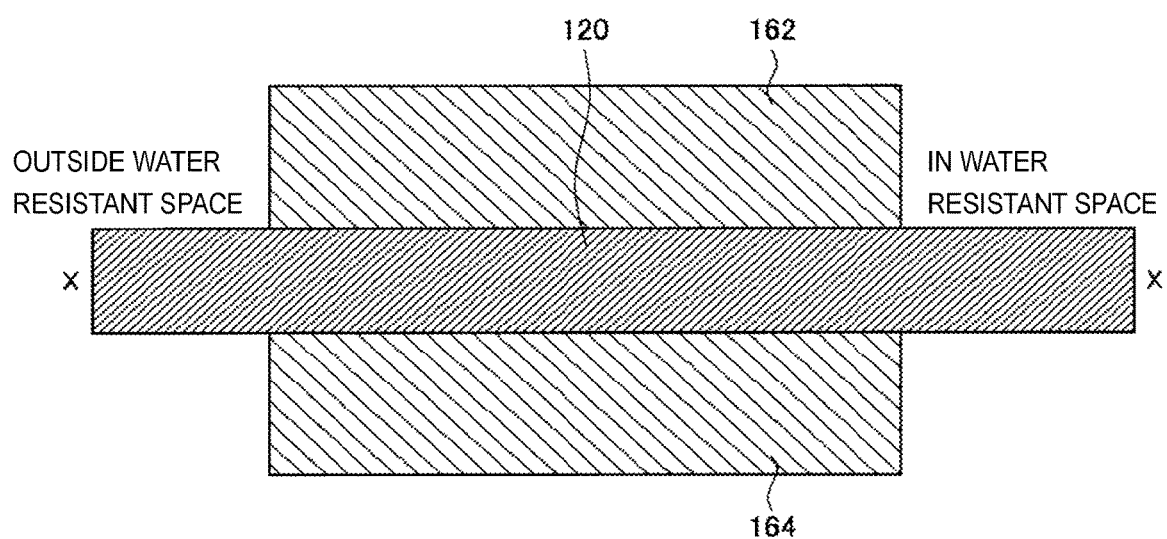
FIG. 13 is an illustration diagram for describing the water resistance function of the electronic device according to the embodiment.

The water resistance function of the first segment 130 will now be described in detail with reference to FIG. 12 to FIG. 15. FIG. 12 shows the position of placement of the first bonding member 164 and the second bonding member 162 on the FPC 120 installed in the first segment 130 of the electronic device 100 according to the embodiment. FIG. 13 is a cross-sectional view taken along line X-X in FIG. 12 as seen in the direction of the arrows.

The first bonding member 164 and the second bonding member 162 are installed seamlessly on the entire periphery of the frame portion 121 of the FPC 120. Thereby, the first bonding member 164 and the second bonding member 162 are stuck to the frame portion 121 of the FPC 120 in a state of surface contact without a gap. Although not shown, also for the portion between the second bonding member 162 and the water resistant cover 176 and the portion between the first bonding member 164 and the casing 134, the first bonding member 164 and the second bonding member 162 are similarly stuck to the respective members in a state of surface contact without a gap (see FIG. 2). Therefore, the area inside the position of adhesion of the first bonding member 164 and the second bonding member 162 in a frame-like shape is sealed without a gap, and a water resistant space is formed.

Figure 14:
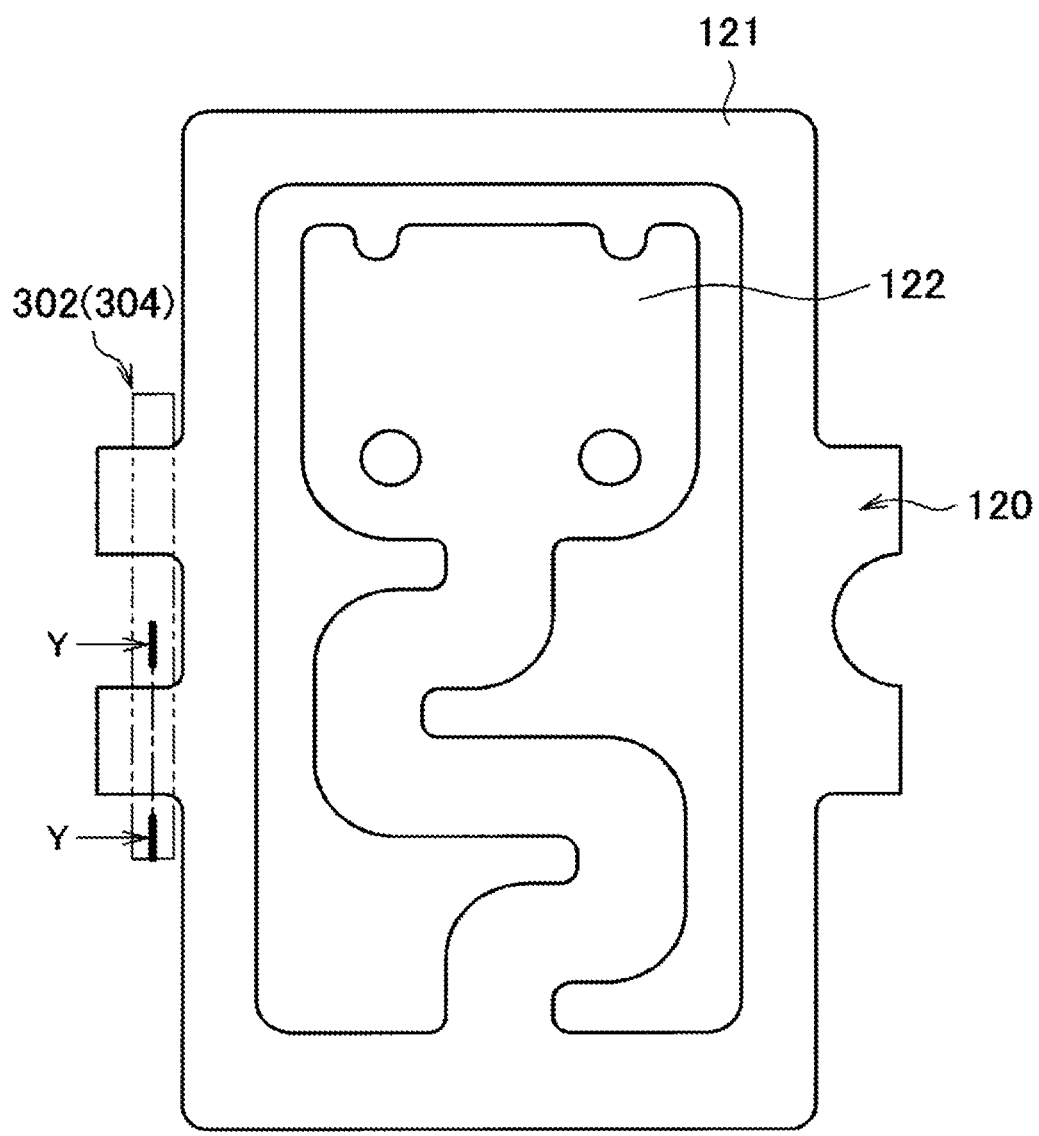
FIG. 14 is an illustration diagram showing the position of placement of a bonding member according to a reference example.
Figure 15:
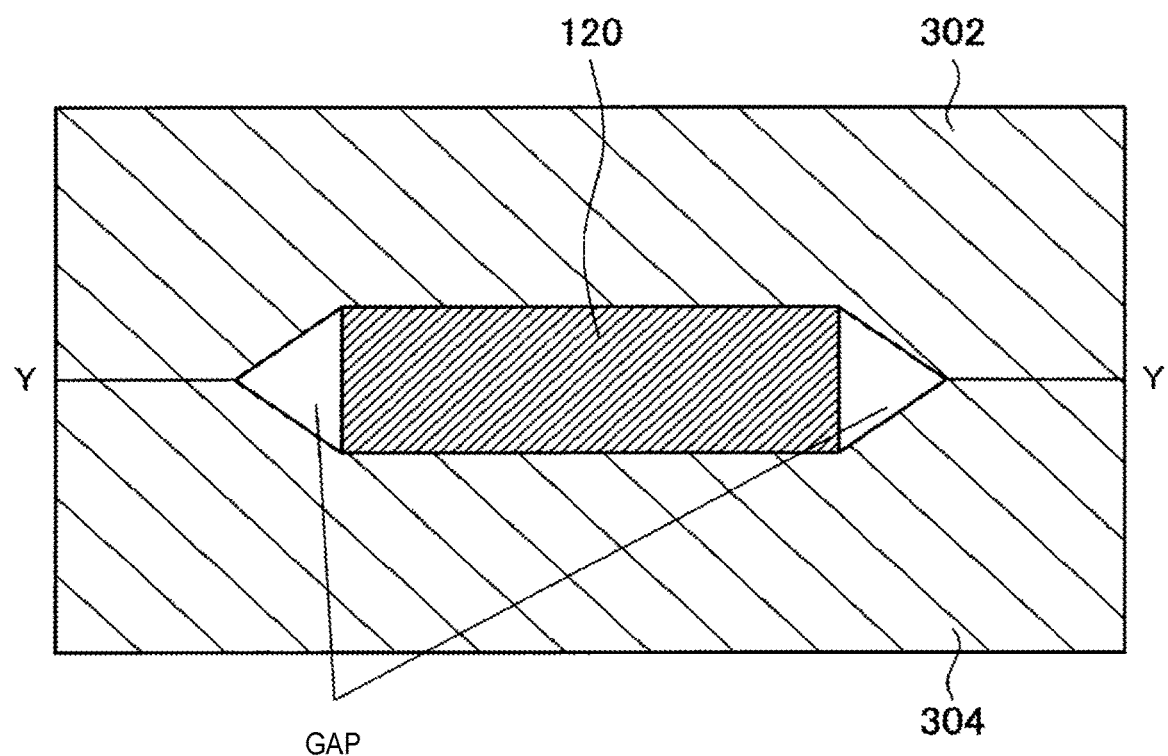
FIG. 15 is an illustration diagram for describing the water resistance of an electronic device according to the reference example.

In contrast, for example as shown in FIG. 14, it is assumed that it is attempted to perform sealing in the arm unit 140, which serves as the inlet port of the FPC 120 in the first segment 130, by sticking a first bonding member 302 and a second bonding member 304 so as to sandwich the FPC 120 divided in two sections. In this case, even assuming that, in the arm unit 140, the first bonding member 302 and the second bonding member 304 can be stuck to the casing 134 and the cover 132 without a gap, a gap is formed on both sides in the width direction of the FPC 120 as shown in FIG. 15. Consequently, water may enter the area where the electronic component and the terminal portion of the FPC 120 are placed, and it is difficult to ensure the water resistance function.

Thus, in the electronic device 100 according to the embodiment, the water resistance function of the area in the first segment 130 where the electronic component, the terminal portion of the FPC 120, etc. are placed is ensured. Thereby, short-circuiting, electric leakage, corrosion, etc. due to the adhesion of water to the secondary battery 174, the terminal portion and the connector portion 124 of the FPC 120, etc. existing in the water resistant space can be prevented.

3. Connection Structure of the Electronic Device

Figure 16:
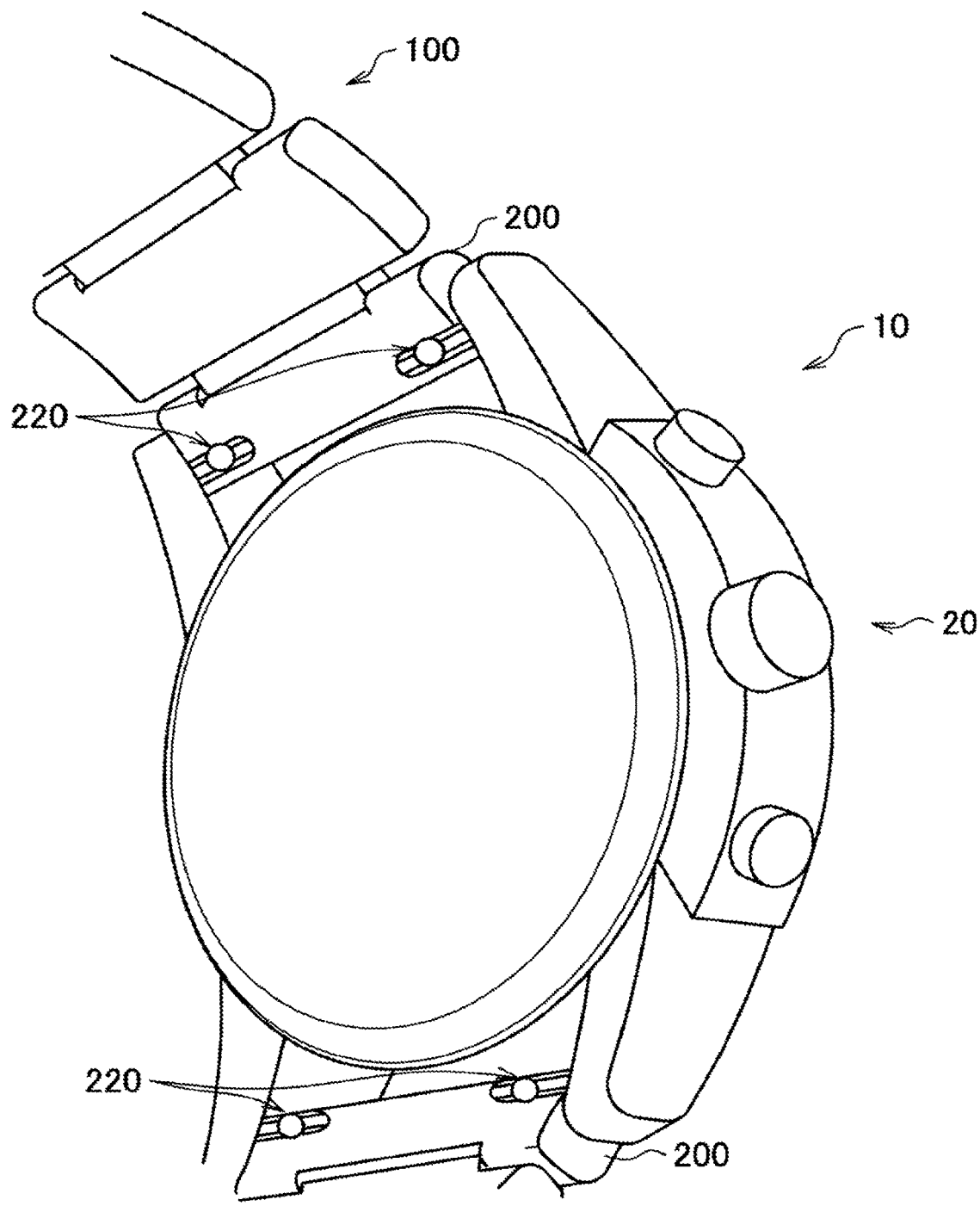
FIG. 16 is a perspective view of the connection portion between the electronic device according to the embodiment and a watch main body as viewed from the back side.
Figure 17:
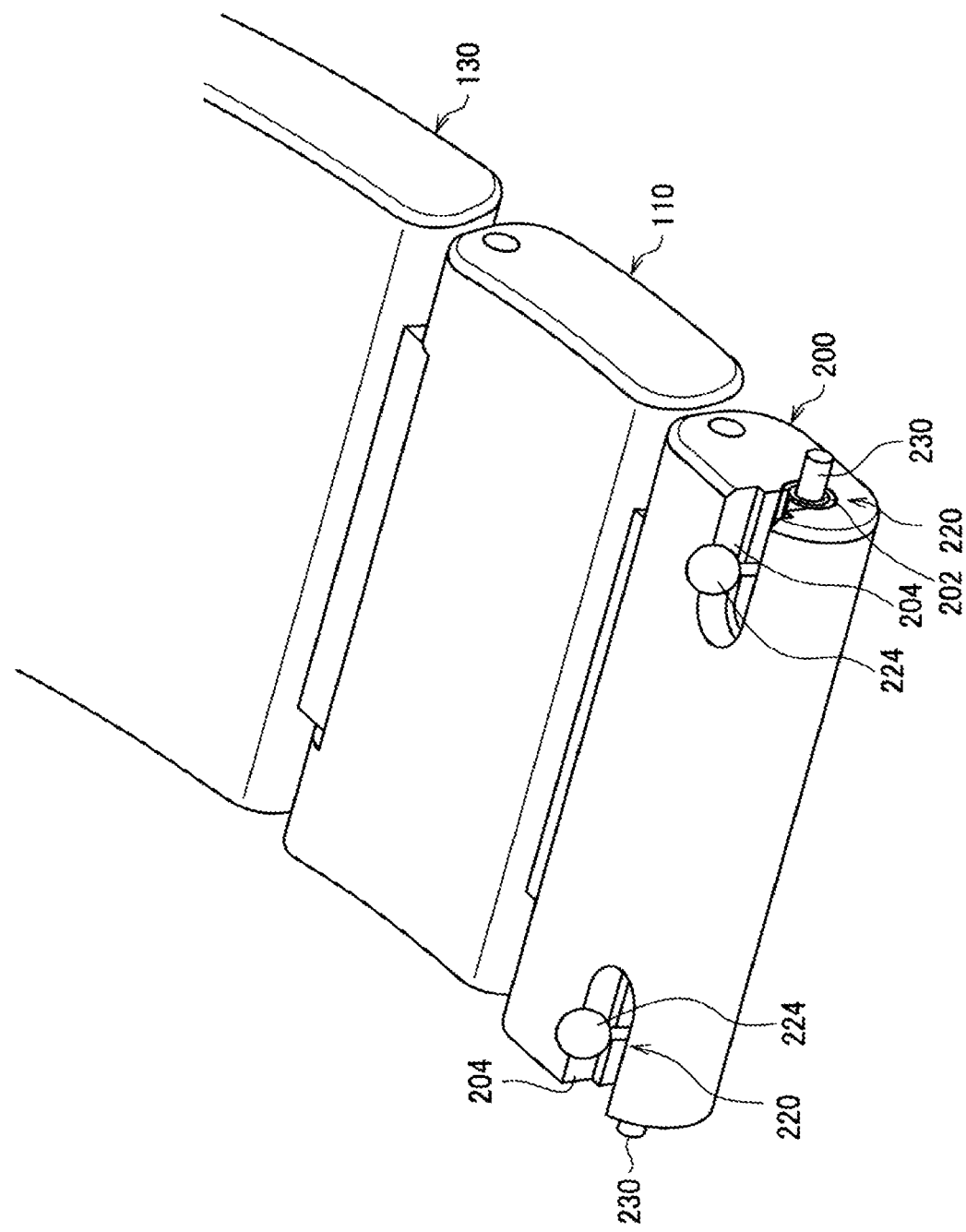
FIG. 17 is a perspective view showing a connecting link.
Figure 18:
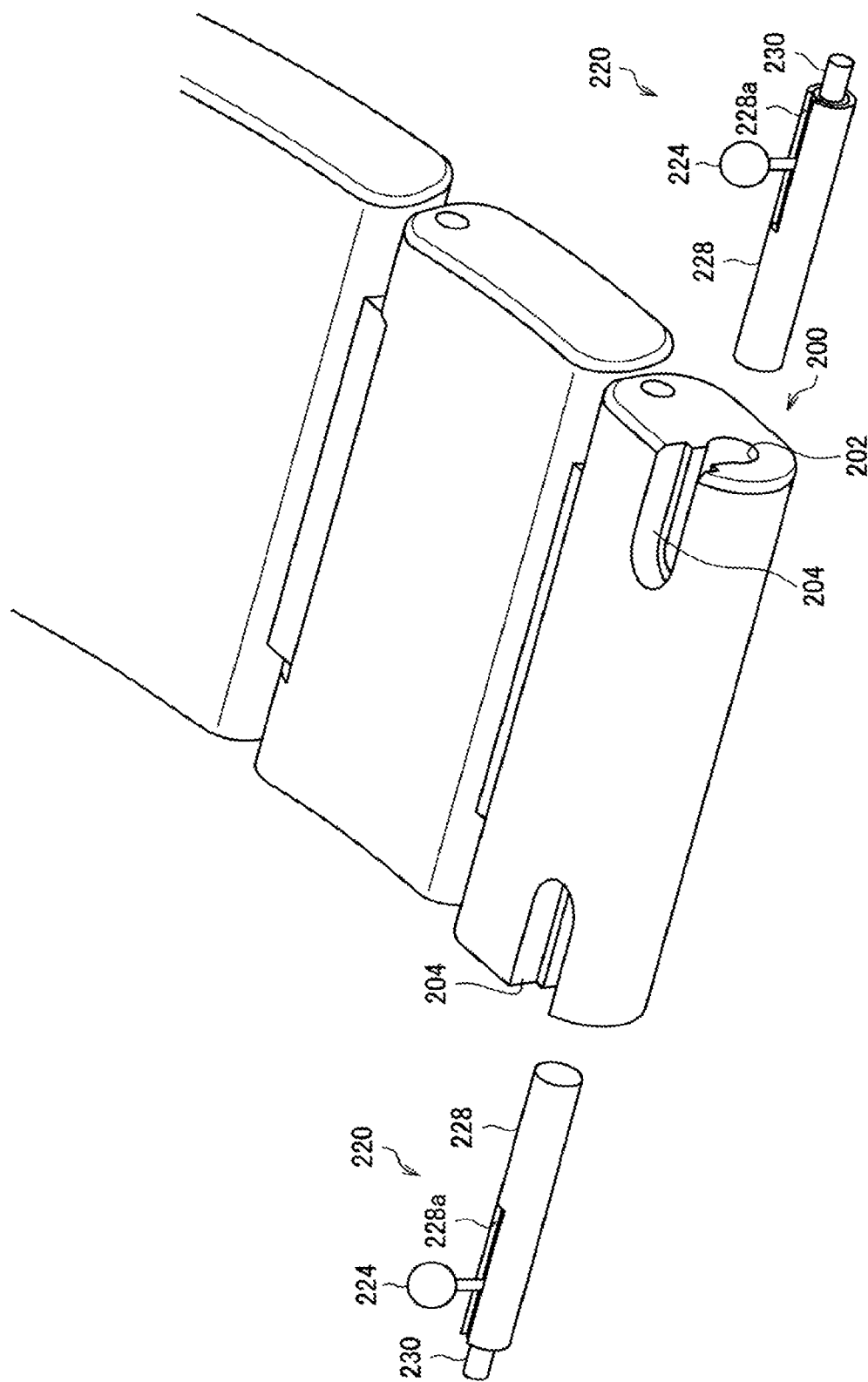
FIG. 18 is a disassembled perspective view of the connecting link.
Figure 19:
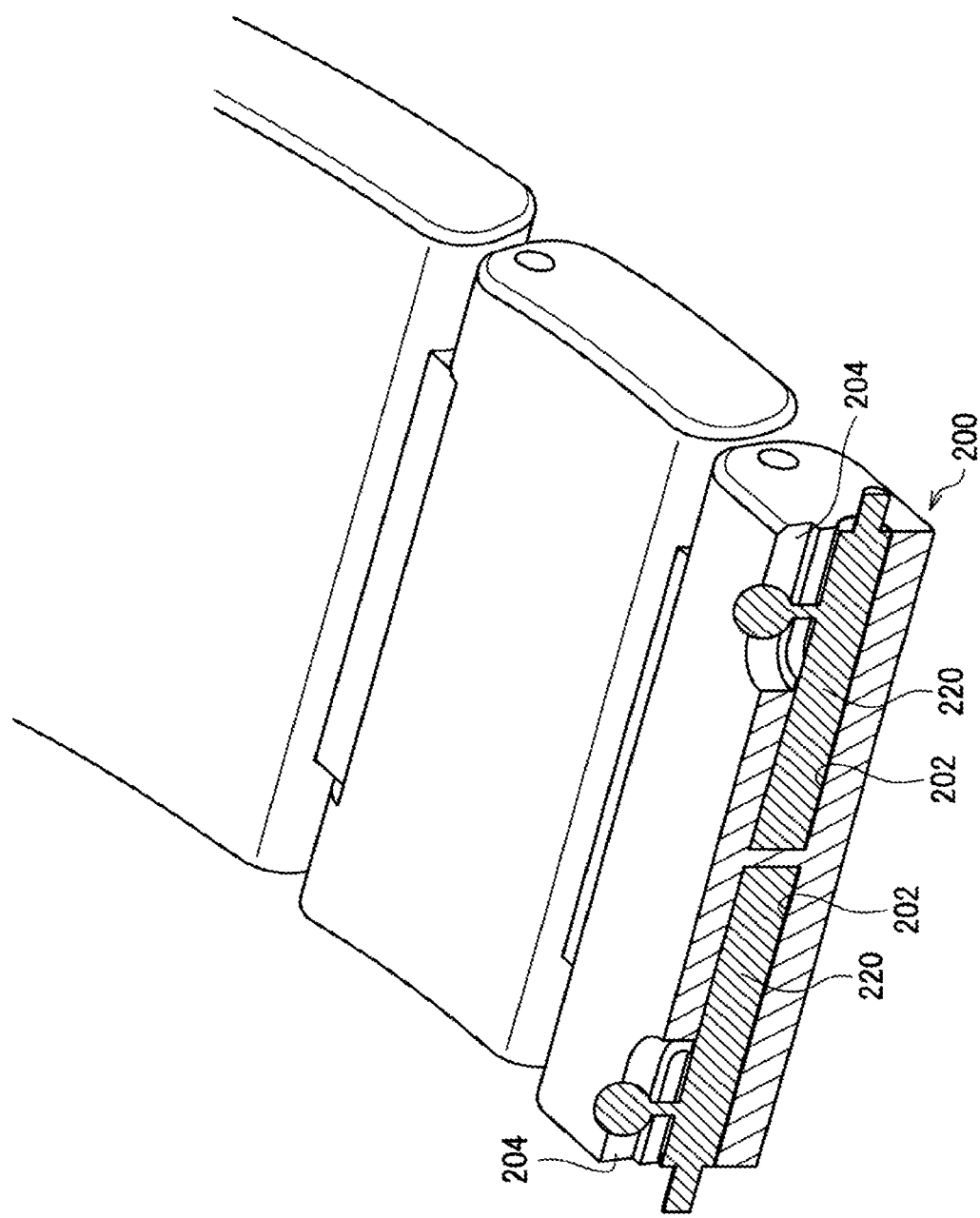
FIG. 19 is a schematic cross-sectional view of the connecting link.
Figure 20:
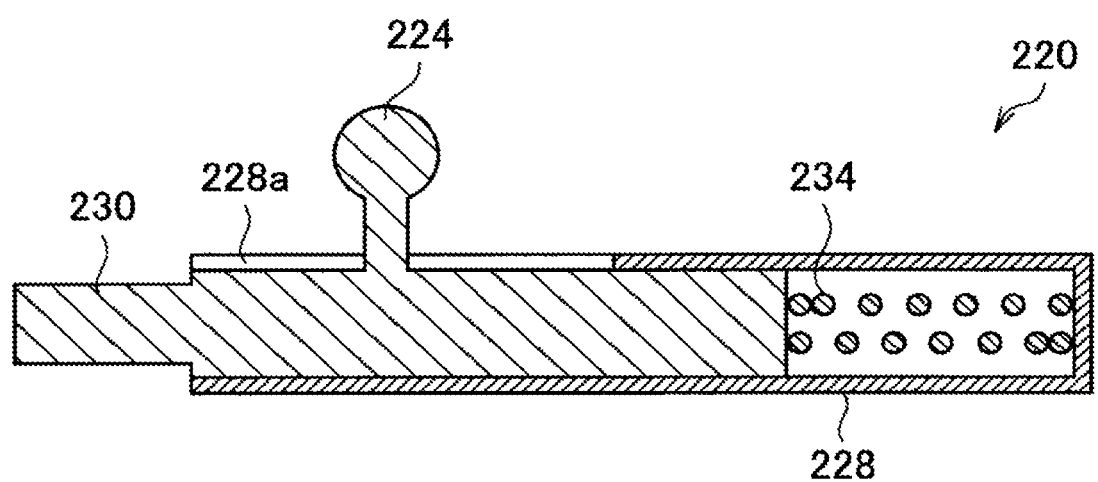
FIG. 20 is a cross-sectional view of a lever pin.

Next, the connection structure between the electronic device 100 according to the embodiment and the watch main body 20 is described. FIG. 16 to FIG. 20 are illustration diagrams showing the connection structure between the electronic device 100 and the watch main body 20. FIG. 16 is a perspective view of the connection portion between the electronic device 100 and the watch main body 20 as viewed from the back side of the wristwatch 10. FIG. 17 is a perspective view showing the connecting link 200 of the electronic device 100, and FIG. 18 is a disassembled perspective view of the connecting link 200. FIG. 19 is a diagram schematically showing a cross section of the connecting link 200, and FIG. 20 is a cross-sectional view showing a connecting component 220 using a lever pin 230.

As described before, the electronic device 100 according to the embodiment can be used as the band portion of the wristwatch 10, and is used to be connected to an arbitrary watch main body 20. The electronic device 100 includes a connecting link 200 equipped with a connecting component 220 in an end portion, and can be attached to and detached from the watch main body 20 by the user. When a band-type electronic device 100 in which a plurality of links 102 are linked is attachable to and detachable from an arbitrary article, it is expected that the sense of incongruity with the portability or wearability of the electronic device 100 will be reduced, and the selection range of the position of wearing or attachment can be expanded.

The connecting link 200 is, for example, a solid member made of stainless steel, titanium, or a resin material, and a hole 202 into which the connecting component 220 is press-fitted is formed on the surfaces on both sides in the width direction of the connecting link 200 (see FIG. 19). A width-direction trench 204 formed along the width direction is formed on the back surface of the connecting link 200. A bottom portion of the width-direction trench 204 communicates with the hole 202. The connecting component 220 is lightly press-fitted in the hole 202, and is thrust against the end of the hole 202. The connecting component 220 includes a cylinder 228 in a cylindrical shape of which one end is opened, a lever pin 230 inserted in the cylinder 228 and held in an axially movable manner in the cylinder 228, and a compression spring 234 installed between the closed end surface of the cylinder 228 and the rear end surface of the lever pin 230.

The tip of the lever pin 230 protrudes from the cylinder 228 in a state where the lever pin 230 is biased in the axial direction by the compression spring 234. Not-shown engaging holes into each of which the tip of the lever pin 230 can be inserted are provided in the watch main body 20, and the lever pins 230 protruding on both sides in the width direction of the connecting link 200 are engaged with the engaging holes of the watch main body 20; thereby, the watch main body 20 and the electronic device 100 are connected together. The lever pin 230 has a lever portion 224 protruding outward in the diameter direction. The lever portion 224 is inserted in the cylinder 228 through a slit 228a provided along the axial direction. The slit 228a of the cylinder 228 is located in a bottom portion of the width-direction trench 204 provided in the connecting link 200, and the lever portion 224 is slidable through the width-direction trench 204 and the slit 228a.

The tip (the protrusion end) of the lever portion 224 protrudes from the back surface of the connecting link 200. Therefore, the user may, for example, push the two lever portions 224 with the thumb and the forefinger inward in the width direction; thereby, the lever pins 230 can be recessed toward the interiors of the cylinders 228 against the biasing force of the compression springs 234. The electronic device 100 is attachable to and detachable from the watch main body 20 in a state where the tips of the lever pins 230 are recessed to near the positions of both end surfaces in the width direction of the connecting link 200.

Figure 21:
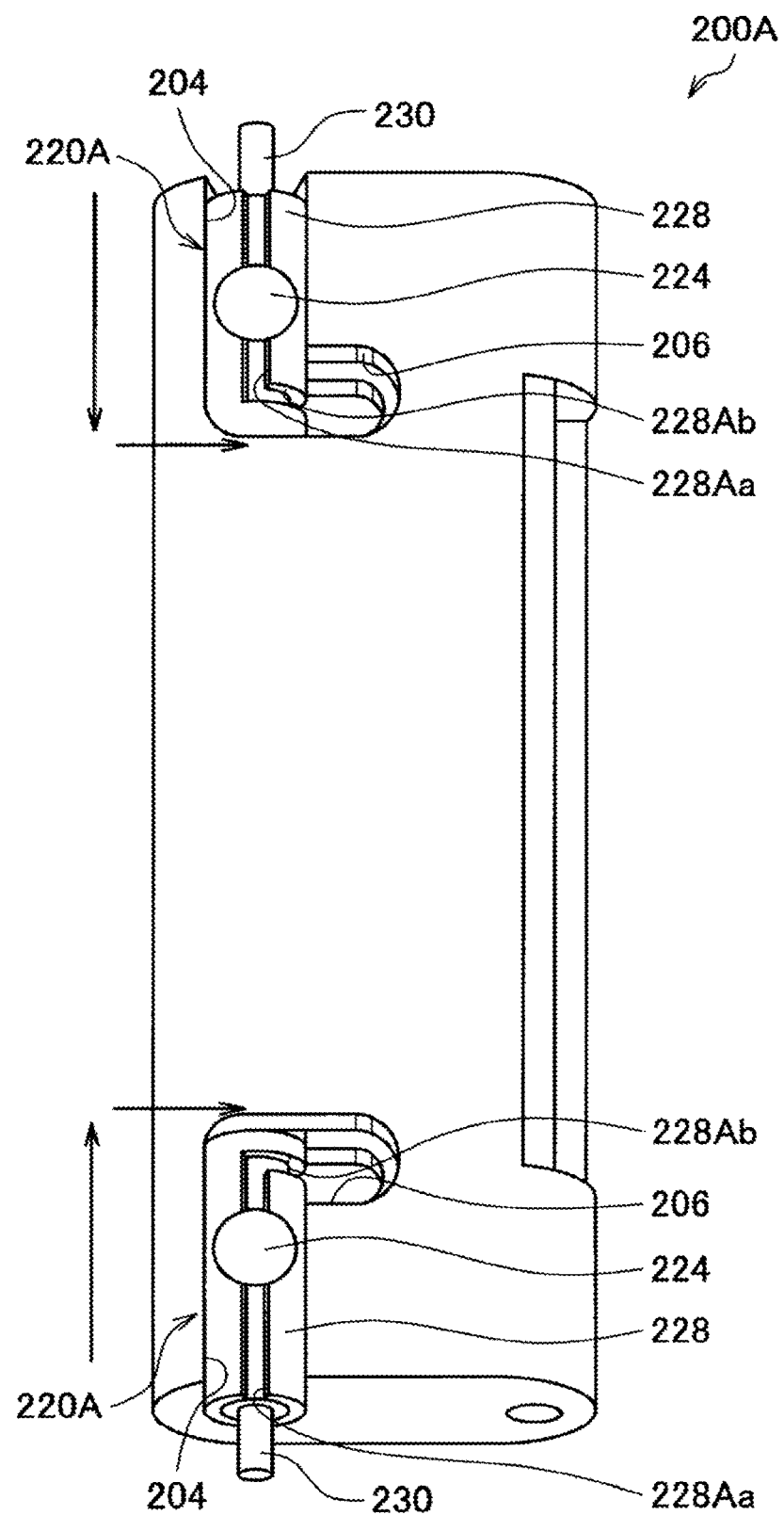
FIG. 21 is a perspective view showing a modification example of the connecting link.

FIG. 21 shows a modification example of a connecting link 200A. In the connecting link 200A, the slit provided in the cylinder 228 of a connecting component 220A has an axial-direction slit portion 228Aa and a round-direction slit portion 228Ab. The width-direction trench 204 provided in the connecting link 200A has a lever housing portion 206 that is provided to extend in a direction orthogonal to the width-direction trench 204 to correspond to the round-direction slit portion 228Ab.

In the connecting link 200A according to the modification example, when attaching and detaching the electronic device 100 and the watch main body 20, the two lever portions 224 are moved inward along the axial-direction slit portions 228Aa, and are then slid in the round direction along the round-direction slit portions 228Ab. Thus, the lever portions 224 are locked in the round-direction slit portions 228Ab by the biasing force in the axial direction of the compression springs 234 provided in the connecting components 220A, and the lever pins 230 can be held in the state of being recessed even when the user has taken the fingers off. Thereby, for example, the two lever pins 230 can be attached to and detached from the watch main body 20 sequentially one by one, and the attachment and detachment operation of the electronic device 100 and the watch main body 20 can be made easy.

Since the electronic device 100 according to the embodiment has such a connection structure, an arbitrarily selected watch main body 20 can be connected to a band-type electronic device 100 formed by a plurality of links 102 being linked. Therefore, an electronic device 100 with little sense of incongruity of the external appearance and the wearing condition can be obtained while an appropriate embodiment of the wristwatch 10 is employed in accordance with the usage environment, the use, the feeling of the user, etc. Furthermore, an arbitrary component having an appropriate function such as an accessory may be connected in place of the watch main body 20, and the selection range of the position of wearing or attachment of the electronic device 100 can be expanded.

The electronic device 100 according to the embodiment described above includes the support unit 150 for maintaining the direction of pushing-out of the loosening portion 128 of the FPC 120 formed in the second segment 110 to a fixed direction. Therefore, although the FPC 120 is installed throughout a plurality of links 102, the FPC 120 can be deformed by loosening to follow the bending and stretching movement of the electronic device 100 without being damaged.

Furthermore, in the electronic device 100 according to the embodiment, the loosening portion 128 of the FPC 120 is pressed against the inner surface of the second segment 110 from a state where the first segment 130 and the second segment 110 are stretched to a state where they are bent. Therefore, the FPC 120 can be prevented from being rubbed at the contact position between the loosening portion 128 of the FPC 120 and the inner surface of the second segment 110 and receiving a flaw.

Furthermore, the electronic device 100 according to the embodiment includes the low friction layer 192 on a position that is in the inner surface of the second segment 110 and that the loosening portion 128 of the FPC 120 is in contact with. Therefore, even when the contact position between the FPC 120 and the inner surface of the second segment 110 is shifted in association with the bending and stretching movement of the electronic device 100, the FPC 120 can be prevented from receiving scratches.

Furthermore, the electronic device 100 according to the embodiment includes the bonding sheet 184 and the buffer member 182 for separating the FPC 120 from the edge of the board installation opening 144 serving as the outlet port of the FPC 120 from the first segment 130. Therefore, when the loosening shape of the loosening portion 128 of the FPC 120 changes, the FPC 120 can be prevented from receiving a flaw or a dent due to contact with the edge of the board installation opening 144.

Furthermore, in the electronic device 100 according to the embodiment, the FPC 120 is fixed so as not to move in the first segment 130 in which the electronic component electrically connected to the FPC 120 is housed. The change in the length of installation of the FPC 120 associated with the bending and stretching movement of the electronic device 100 is absorbed by the loosening portion 128 in the second segment 110. Therefore, in the first segment 130, the water resistance function of the water resistant space where the electronic component and the electrically conductive portions are held can be ensured.

Furthermore, the electronic device 100 according to the embodiment is attachable to and detachable from an arbitrarily selected watch main body 20, accessory, etc. via the connecting link 200 linked in an end portion of the electronic device 100. Therefore, an electronic device 100 with little sense of incongruity of the external appearance and the wearing condition can be obtained while an arbitrary embodiment is employed in accordance with the usage environment, the use, the feeling of the user, etc. In addition, when the electronic device 100 is attachable to and detachable from an arbitrary article, the selection range of the position of wearing or attachment of the electronic device 100 can be expanded.

It should be understood by those skilled in the art that various modifications, combinations, sub-combinations and alterations may occur depending on design requirements and other factors insofar as they are within the scope of the appended claims or the equivalents thereof.

Further, the effects described in this specification are merely illustrative or exemplified effects, and are not limitative. That is, with or in the place of the above effects, the technology according to the present disclosure may achieve other effects that are clear to those skilled in the art based on the description of this specification.

Additionally, the present technology may also be configured as below.

(1) An electronic device including:
a first segment and a second segment linked to each other in a rotationally movable manner;
a flexible circuit board installed throughout the first segment and the second segment in interiors of the first segment and the second segment;
a loosening portion formed by the flexible circuit board being pushed out while being bent in the second segment; and
a support unit configured to maintain a direction of pushing-out of the loosening portion to a fixed direction.

(2) The electronic device according to (1),
wherein the flexible circuit board is fixed to the first segment, and
a shape of the loosening portion changes in the second segment with bending and stretching movement of the first segment and the second segment.

(3) The electronic device according to (1) or (2), wherein the loosening portion is maintained in a state of being bent in a range of rotational movement of the first segment and the second segment.

(4) The electronic device according to any one of (1) to (3), wherein the first segment has an arm unit in an end portion on the second segment side, and at least part of the arm unit is placed in an insertion opening provided in the second segment.

(5) The electronic device according to any one of (1) to (4),
wherein the first segment includes, in an end portion on the second segment side, a board installation opening configured to allow the flexible circuit board to pass through, and
the support unit is formed by inclining a portion that is in an inner surface of the board installation opening and is located on an opposite side to the direction of pushing-out of the loosening portion toward the direction of pushing-out.

(6) The electronic device according to (5), wherein the first segment includes a casing and a cover, and the board installation opening is formed by the cover being attached to the casing.

(7) The electronic device according to (5) or (6), wherein the inner surface of the board installation opening in which the support unit is formed has a projecting portion projecting further to an outside than an edge that is of the inner surface of the board installation opening and is located on a side of the direction of pushing-out of the loosening portion, and the support unit is formed in the projecting portion.

(8) The electronic device according to any one of (5) to (7), wherein at least one surface of the flexible circuit board is fixed to the inner surface of the board installation opening by a bonding layer.

(9) The electronic device according to any one of (5) to (8), including, between the flexible circuit board and the inner surface of the board installation opening, a buffer member configured to separate the flexible circuit board from an edge of the board installation opening.

(10) The electronic device according to (9), wherein the buffer member is a bonding sheet configured to fix the flexible circuit board to the inner surface of the board installation opening.

(11) The electronic device according to (9) or (10), wherein the support unit is formed by inclining the buffer member provided on an opposite side to the direction of pushing-out of the loosening portion of the flexible circuit board toward the direction of pushing-out.

(12) The electronic device according to any one of (1) to (11), wherein the loosening portion is in contact with an inner surface of the second segment in at least part of the range of rotational movement of the first segment and the second segment.

(13) The electronic device according to (12), wherein, in a state where the first segment and the second segment are stretched, the loosening portion is in contact with the inner surface of the second segment.

(14) The electronic device according to any one of (1) to (13), including, on a position that is in an inner surface of the second segment located in the direction of pushing-out of the loosening portion and that at least the loosening portion is in contact with, a low friction layer having a coefficient of friction smaller than a coefficient of friction of the inner surface of the second segment.

(15) The electronic device according to any one of (1) to (14), wherein the first segment includes a housing portion in which an electronic component is housed, and the housing portion is a water resistant space.

(16) The electronic device according to (15),
wherein the first segment includes a casing having the housing portion and a cover,
the flexible circuit board located in the first segment has a terminal portion configured to be electrically connected to the electronic component, and
the water resistant space is formed by fixing both surfaces of the flexible circuit board to the casing, the cover, or a water resistant sheet using a bonding member placed to surround an area where the terminal portion is provided.

(17) The electronic device according to (16), wherein the flexible circuit board located in the first segment includes a frame portion and an electrical connection portion connected to part of the frame portion and provided with the terminal portion, and the bonding member is placed in the frame portion.

(18) The electronic device according to (16) or (17), wherein a surface on the casing side of the frame portion of the flexible circuit board is fixed to an edge portion of the housing portion of the casing by the bonding member, a surface on the cover side of the frame portion is fixed to a water resistant cover by the bonding member, and an area surrounded by the bonding member, the water resistant cover, and the housing portion is the water resistant space.

(19) The electronic device according to any one of (1) to (18), wherein the first segment is linked to each of both ends of the second segment, and the flexible circuit board is installed from one of the first segments through the second segment and the other of the first segments.

(20) The electronic device according to any one of (1) to (19), wherein the electronic device is a device configured to be worn to be wound around an arm or a leg, and the direction of pushing-out of the loosening portion is a direction located on a front side at a time of wearing the electronic device.

What is claimed is:
1. An electronic device comprising:
a wristwatch main body; and
a wristwatch band portion, wherein the wristwatch band portion comprises:
a first segment and a second segment linked to each other in a rotationally movable manner;
a flexible circuit board installed throughout the first segment and the second segment in interiors of the first segment and the second segment such that the flexible circuit board extends out of the first segment into the second segment;
a slack section in the flexible circuit board which is curved and includes a bend in a predetermined direction in the second segment, the slack section including at least two points of inflection; and
a protrusion that bends the flexible circuit board to impart the bend in the slack section in a fixed direction.

2. The electronic device according to claim 1,
wherein the flexible circuit board is fixed to the first segment, and
a shape of the slack section changes in the second segment with bending and stretching movement of the first segment and the second segment.

3. The electronic device according to claim 1, wherein the slack section is maintained in a state of being bent in a range of rotational movement of the first segment and the second segment.

4. The electronic device according to claim 1, wherein the first segment has an arm in an end portion on a second segment side, and at least part of the arm is placed in an insertion opening provided in the second segment.

5. The electronic device according to claim 1,
wherein the first segment includes, in an end portion on a second segment side, a board installation opening configured to allow the flexible circuit board to pass through, and
the protrusion is formed by inclining a portion that is in an inner surface of the board installation opening and is located on an opposite side to the direction of pushing-out of the slack section toward the direction of pushing-out.

6. The electronic device according to claim 5, wherein the first segment includes a casing and a cover, and the board installation opening is formed by the cover being attached to the casing.

7. The electronic device according to claim 5, wherein the inner surface of the board installation opening in which the protrusion is formed has a projection projecting further to an outside than an edge that is of the inner surface of the board installation opening and is located on a side of the direction of pushing-out of the slack section, and the protrusion is formed in the projection.

8. The electronic device according to claim 5, wherein at least one surface of the flexible circuit board is fixed to the inner surface of the board installation opening by a bonding layer.

9. The electronic device according to claim 5, comprising, between the flexible circuit board and the inner surface of the board installation opening, a buffer configured to separate the flexible circuit board from an edge of the board installation opening.

10. The electronic device according to claim 9, wherein the buffer is a bonding sheet configured to fix the flexible circuit board to the inner surface of the board installation opening.

11. The electronic device according to claim 9, wherein the protrusion is formed by inclining the buffer provided on an opposite side to the predetermined direction of the slack section of the flexible circuit board toward the predetermined direction.

12. The electronic device according to claim 1, wherein the slack section is in contact with an inner surface of the second segment in at least part of a range of rotational movement of the first segment and the second segment.

13. The electronic device according to claim 12, wherein, in a state where the first segment and the second segment are stretched, the slack section is in contact with the inner surface of the second segment.

14. The electronic device according to claim 1, comprising, on a position that is in an inner surface of the second segment located in the predetermined direction and that at least the slack section is in contact with, a low friction layer having a coefficient of friction smaller than a coefficient of friction of the inner surface of the second segment.

15. The electronic device according to claim 1, wherein the first segment includes a housing in which an electronic component is housed, and the housing is a water resistant space.

16. The electronic device according to claim 15,
wherein the first segment includes a casing having the housing and a cover,
the flexible circuit board located in the first segment has a terminal configured to be electrically connected to the electronic component, and
the water resistant space is formed by fixing both surfaces of the flexible circuit board to the casing, the cover, or a water resistant sheet using a bonding which surrounds an area where the terminal is provided.

17. The electronic device according to claim 16, wherein the flexible circuit board located in the first segment includes a frame and an electrical connection connected to part of the frame and provided with the terminal, and the bonding is in the frame.

18. The electronic device according to claim 17, wherein a surface on a casing side of the frame of the flexible circuit board is fixed to an edge of the housing of the casing by the bonding, a surface on a cover side of the frame is fixed to a water resistant cover by the bonding, and an area surrounded by the bonding, the water resistant cover, and the housing is the water resistant space.

19. The electronic device according to claim 1, wherein the first segment is one of a plurality of first segments and is linked to each of both ends of the second segment, and the flexible circuit board is installed from one of the first segments through the second segment and another of the first segments.

20. The electronic device according to claim 1, wherein the direction of pushing-out of the slack section is a direction located on a front side at a time of wearing the electronic device.

* * * * *